United States Patent
John Wilson et al.

(10) Patent No.: US 11,259,320 B2
(45) Date of Patent: Feb. 22, 2022

(54) MULTIPLE-BEAM UPLINK RANDOM ACCESS CHANNEL MESSAGES

(71) Applicant: QUALCOMM Incorporated, San Diego, CA (US)

(72) Inventors: Makesh Pravin John Wilson, San Diego, CA (US); Tao Luo, San Diego, CA (US); Sony Akkarakaran, Poway, CA (US); Sumeeth Nagaraja, San Diego, CA (US); Wooseok Nam, San Diego, CA (US); Shengbo Chen, San Diego, CA (US); Xiao Feng Wang, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/040,208

(22) Filed: Jul. 19, 2018

(65) Prior Publication Data

US 2019/0029036 A1    Jan. 24, 2019

Related U.S. Application Data

(60) Provisional application No. 62/535,804, filed on Jul. 21, 2017.

(51) Int. Cl.
*H04W 74/00*    (2009.01)
*H04W 74/08*    (2009.01)
(Continued)

(52) U.S. Cl.
CPC ........ *H04W 74/002* (2013.01); *H04B 7/0408* (2013.01); *H04B 7/0617* (2013.01); *H04W 74/0833* (2013.01); *H04W 74/0866* (2013.01)

(58) Field of Classification Search
CPC ........... H04W 74/0866; H04W 74/002; H04W 74/0833; H04B 7/0617; H04B 7/0695; H04B 7/0408; H04B 7/088
See application file for complete search history.

(56) References Cited

U.S. PATENT DOCUMENTS

| | | | |
|---|---|---|---|
| 2013/0301567 A1* | 11/2013 | Jeong | H04W 74/0833 370/329 |
| 2014/0254515 A1* | 9/2014 | Kim | H04W 74/0833 370/329 |

(Continued)

OTHER PUBLICATIONS

Samsung: "NR 4-Step Random Access Procedure," 3GPP Draft; R1-1700891,3rd Generation Partnership Project (3GPP), Mobile Competence Centre; 650, Route Des Lucioles; F-06921 Sophia-Antipolis Cedex; France, vol. RAN WG1, No. Spokane, Wa; 20170116-20170120, Jan. 16, 2017, XP051208407, 14 pages. (Year: 2017).*

(Continued)

*Primary Examiner* — Romani Ohri
(74) *Attorney, Agent, or Firm* — Holland & Hart LLP

(57) ABSTRACT

Methods, systems, and devices for wireless communication are described. Uplink random access channel (RACH) transmissions may be sent on multiple beams by a user equipment (UE). For example, a UE may transmit a random access preamble to a base station in a first RACH transmission, and the base station may respond with a random access response in a second RACH transmission. The second RACH transmission may include an indication for the UE to use multiple transmit beams for a third RACH transmission. Using the indication received from the base station, the UE may proceed to use the indicated two or more beams when sending the third RACH transmission to the base station. Upon receiving the third RACH transmission from the UE, the base station may respond with a fourth RACH transmis- (Continued)

sion, which may further include an indication to the UE to transmit an acknowledgment using one or more beams.

28 Claims, 18 Drawing Sheets

(51) Int. Cl.
*H04B 7/0408* (2017.01)
*H04B 7/06* (2006.01)

(56) References Cited

U.S. PATENT DOCUMENTS

| | | | | |
|---|---|---|---|---|
| 2015/0009951 | A1* | 1/2015 | Josiam | H04L 25/0224 370/330 |
| 2016/0360463 | A1* | 12/2016 | Kim | H04B 7/0617 |
| 2017/0231011 | A1* | 8/2017 | Park | H04W 74/006 |
| 2017/0288763 | A1* | 10/2017 | Yoo | H04W 72/085 |
| 2018/0020487 | A1* | 1/2018 | Tsai | H04W 74/004 |
| 2018/0279286 | A1* | 9/2018 | Akoum | H04W 72/046 |
| 2019/0132850 | A1* | 5/2019 | Sun | H04W 72/005 |
| 2019/0141752 | A1* | 5/2019 | Kim | H04W 76/11 |
| 2019/0357274 | A1* | 11/2019 | Lee | H04B 7/0695 |
| 2020/0296765 | A1* | 9/2020 | Kim | H04W 74/0833 |

OTHER PUBLICATIONS

Nokia et al.:"NR 4-step RACH Procedure," 3GPP Draft; R1-1710892_NR 4-Step RACH Procedure, 3rd Generation Partnership Project (3GPP), vol. RAN WG1, No. Qingdao, China 20170627-20170630, Jun. 26, 2017, XP051300093, 9 pages (Year: 2017).*
International Search Report and Written Opinion—PCT/US2018/043143—ISA/EPO—Oct. 4, 2018 (175427WO).
Nokia, et al.: "NR 4-step RACH Procedure," 3GPP Draft; R1-1710892_NR 4-Step RACH Procedure, 3rd Generation Partnership Project (3GPP), Mobile Competence Centre; 650, Route Des Lucioles; F-06921, Sophia-Antipolis Cedex; France, vol. RAN WG1, No. Qingdao, China; 20170627-20170630, Jun. 26, 2017, XP051300093, 9 pages, Retrieved from the Internet: URL: http://www.3gpp.org/ftp/Meetings_3GPP_SYNC/RAN1/Docs/ [retrieved on Jun. 26, 2017].
Qualcomm Incorporated: "Measurement Reporting and Beam Refinement during RACH," 3GPP Draft; R2-1706912 Beam Refinement After RACH, 3rd Generation Partnership Project (3GPP), Mobile Competence Centre; 650, Route Des Lucioles; F-06921 Sophia-Antipolis Cedex; France, vol. RAN WG2, No. Qingdao, China; 20170627-20170629, Jun. 26, 2017, XP051301409, 8 pages, Retrieved from the Internet: URL: http://www.3gpp.org/ftp/Meetings_3GPP_SYNC/RAN2/Docs/ [retrieved on Jun. 26, 2017].
Samsung: "NR 4-Step Random Access Procedure," 3GPP Draft; R1-1700891, 3rd Generation Partnership Project (3GPP), Mobile Competence Centre; 650, Route Des Lucioles; F-06921 Sophia-Antipolis Cedex; France, vol. RAN WG1, No. Spokane, Wa; 20170116-20170120, Jan. 16, 2017, XP051208407, 14 pages, Retrieved from the Internet: URL: http://www.3gpp.org/ftp/Meetings_3GPP_SYNC/RAN1/Docs/ [retrieved on Jan. 16, 2017].

* cited by examiner

MULTIPLE-BEAM UPLINK RANDOM ACCESS CHANNEL MESSAGES

CROSS REFERENCES

The present application for patent claims the benefit of U.S. Provisional Patent Application No. 62/535,804 by John Wilson et al., entitled "MULTIPLE-BEAM UPLINK RANDOM ACCESS CHANNEL MESSAGES," filed Jul. 21, 2017, assigned to the assignee hereof, and expressly incorporated by reference in its entirety herein.

BACKGROUND

The following relates generally to wireless communication, and more specifically to multiple-beam uplink random access channel (RACH) messages.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long-Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless systems, base stations and UEs may communicate using directional transmissions (e.g., receive beams and/or transmit beams), where beamforming techniques may be applied using one or more antenna arrays to generate beams in different directions. For example, a base station may transmit downlink communications (e.g., synchronization signals, control, data, etc.) to a UE using a downlink transmit beam in a particular direction, and the UE may in turn receive the downlink communications on a downlink receive beam. The UE may then transmit on the uplink using a corresponding uplink transmit beam. In some cases, a UE may utilize simultaneous (or near simultaneous) transmissions on multiple uplink beams. Such multi-beam transmission techniques may be associated with robust communications and coverage enhancements. It may thus be desirable to implement multi-beam operation as early as possible for communications between a UE and base station, such as during initial access to a cell.

SUMMARY

The described techniques relate to improved methods, systems, devices, or apparatuses that support multiple-beam uplink random access channel (RACH) messages. Generally, the described techniques provide for RACH transmissions on multiple beams, including using multiple beams for an uplink third RACH transmission. For example, a user equipment (UE) may transmit a random access preamble to a base station in a first RACH transmission, and the base station may respond with a random access response in a second RACH transmission. The second RACH transmission may include an indication for the UE to use multiple transmit beams for a subsequent RACH transmission. For example, the base station may identify two or more beams that the UE may use for a third RACH transmission based on the reception of the first RACH transmission from the UE. The base station may also indicate a beam index and/or time-frequency resources associated with each of the two or more beams. Using the indication received from the base station, the UE may proceed to use the indicated two or more beams when sending the third RACH transmission to the base station. Upon receiving the third RACH transmission from the UE, the base station may respond with a fourth RACH transmission, which may further include an indication to the UE to transmit an acknowledgment (or a group acknowledgment) using one or more beams.

A method of wireless communication is described. The method may include transmitting a first RACH transmission to a base station, receiving, from the base station in response to the first RACH transmission, a second RACH transmission that includes an indication of two or more transmit beams for the UE to use to transmit a third RACH transmission, and transmitting the third RACH transmission to the base station using the indicated two or more transmit beams.

An apparatus for wireless communication is described. The apparatus may include means for transmitting a first RACH transmission to a base station, means for receiving, from the base station in response to the first RACH transmission, a second RACH transmission that includes an indication of two or more transmit beams for the UE to use to transmit a third RACH transmission, and means for transmitting the third RACH transmission to the base station using the indicated two or more transmit beams.

Another apparatus for wireless communication is described. The apparatus may include a processor, memory in electronic communication with the processor, and instructions stored in the memory. The instructions may be operable to cause the processor to transmit a first RACH transmission to a base station, receive, from the base station in response to the first RACH transmission, a second RACH transmission that includes an indication of two or more transmit beams for the UE to use to transmit a third RACH transmission, and transmit the third RACH transmission to the base station using the indicated two or more transmit beams.

A non-transitory computer readable medium for wireless communication is described. The non-transitory computer-readable medium may include instructions operable to cause a processor to transmit a first RACH transmission to a base station, receive, from the base station in response to the first RACH transmission, a second RACH transmission that includes an indication of two or more transmit beams for the UE to use to transmit a third RACH transmission, and transmit the third RACH transmission to the base station using the indicated two or more transmit beams.

Some examples of the method, apparatus, and non-transitory computer-readable medium described above may further include processes, features, means, or instructions for identifying receive beams used by the UE to receive synchronization signals from the base station. Some examples of the method, apparatus, and non-transitory computer-readable medium described above may further include processes, features, means, or instructions for determining the two or more transmit beams based on the identified receive beams.

Some examples of the method, apparatus, and non-transitory computer-readable medium described above may further include processes, features, means, or instructions for transmitting, with the third RACH transmission, a beam report that may be based on synchronization signals received by the UE, or reference signals received by the UE, or a combination thereof.

Some examples of the method, apparatus, and non-transitory computer-readable medium described above may further include processes, features, means, or instructions for identifying, based on the second RACH transmission received from the base station, a monitoring pattern for the UE to use to receive a fourth RACH transmission. In some examples of the method, apparatus, and non-transitory computer-readable medium described above, the monitoring pattern may identify a beam for the UE to use to receive the fourth RACH transmission.

Some examples of the method, apparatus, and non-transitory computer-readable medium described above may further include processes, features, means, or instructions for receiving, from the base station in response to the third RACH transmission, a fourth RACH transmission that includes an indication that the UE may be to transmit an acknowledgement to the base station using one or more transmit beams.

In some examples of the method, apparatus, and non-transitory computer-readable medium described above, the indication that the UE is to transmit the acknowledgement to the base station may identify the one or more transmit beams, or uplink control channel resources, or a combination thereof.

Some examples of the method, apparatus, and non-transitory computer-readable medium described above may further include processes, features, means, or instructions for identifying the one or more transmit beams based on the indication of the two or more transmit beams for the UE to use to transmit the third RACH transmission.

Some examples of the method, apparatus, and non-transitory computer-readable medium described above may further include processes, features, means, or instructions for receiving the fourth RACH transmission on a plurality of beams, where the fourth RACH transmission includes a group acknowledgment configuration. Some examples of the method, apparatus, and non-transitory computer-readable medium described above may further include processes, features, means, or instructions for transmitting a group acknowledgment using the one or more transmit beams based on the group acknowledgment configuration.

Some examples of the method, apparatus, and non-transitory computer-readable medium described above may further include processes, features, means, or instructions for receiving synchronization signals from the base station after transmitting the first RACH transmission. Some examples of the method, apparatus, and non-transitory computer-readable medium described above may further include processes, features, means, or instructions for performing a beam refinement procedure based on the received synchronization signals. Some examples of the method, apparatus, and non-transitory computer-readable medium described above may further include processes, features, means, or instructions for transmitting the third RACH transmission based on the performed beam refinement procedure.

In some examples of the method, apparatus, and non-transitory computer-readable medium described above, the indication of the two or more transmit beams may be based on a type of UE deployment.

In some examples of the method, apparatus, and non-transitory computer-readable medium described above, the indication of the two or more transmit beams comprise beam identifiers of the two or more transmit beams, or time-frequency resources for the two or more transmit beams, or a combination thereof.

In some examples of the method, apparatus, and non-transitory computer-readable medium described above, the first RACH transmission includes a random access request. In some examples of the method, apparatus, and non-transitory computer-readable medium described above, the second RACH transmission includes a random access response.

A method of wireless communication is described. The method may include receiving a first RACH transmission from a UE, identifying two or more transmit beams for the UE to use to transmit a third RACH transmission to the base station, transmitting, to the UE in response to the first RACH transmission, a second RACH transmission that includes an indication of the identified two or more transmit beams, and receiving the third RACH transmission from the UE in response to the second RACH transmission.

An apparatus for wireless communication is described. The apparatus may include means for receiving a first RACH transmission from a UE, means for identifying two or more transmit beams for the UE to use to transmit a third RACH transmission to the base station, means for transmitting, to the UE in response to the first RACH transmission, a second RACH transmission that includes an indication of the identified two or more transmit beams, and means for receiving the third RACH transmission from the UE in response to the second RACH transmission.

Another apparatus for wireless communication is described. The apparatus may include a processor, memory in electronic communication with the processor, and instructions stored in the memory. The instructions may be operable to cause the processor to receive a first RACH transmission from a UE, identify two or more transmit beams for the UE to use to transmit a third RACH transmission to the base station, transmit, to the UE in response to the first RACH transmission, a second RACH transmission that includes an indication of the identified two or more transmit beams, and receive the third RACH transmission from the UE in response to the second RACH transmission.

A non-transitory computer readable medium for wireless communication is described. The non-transitory computer-readable medium may include instructions operable to cause a processor to receive a first RACH transmission from a UE, identify two or more transmit beams for the UE to use to transmit a third RACH transmission to the base station, transmit, to the UE in response to the first RACH transmission, a second RACH transmission that includes an indication of the identified two or more transmit beams, and receive the third RACH transmission from the UE in response to the second RACH transmission.

In some examples of the method, apparatus, and non-transitory computer-readable medium described above, the identifying the two or more transmit beams includes determining a deployment type for the UE. Some examples of the method, apparatus, and non-transitory computer-readable medium described above may further include processes, features, means, or instructions for selecting the two or more transmit beams based on the determined deployment type.

In some examples of the method, apparatus, and non-transitory computer-readable medium described above, the identifying the two or more transmit beams includes performing, while receiving the first RACH transmission, a beam refinement procedure for a plurality of beams used for transmitting synchronization signals. Some examples of the method, apparatus, and non-transitory computer-readable medium described above may further include processes, features, means, or instructions for selecting the two or more transmit beams based on the performed beam refinement procedure.

Some examples of the method, apparatus, and non-transitory computer-readable medium described above may further include processes, features, means, or instructions for identifying, based on the indication of the identified two or more transmit beams, a monitoring pattern associated with a plurality of beams for receiving a fourth RACH transmission. Some examples of the method, apparatus, and non-transitory computer-readable medium described above may further include processes, features, means, or instructions for transmitting an indication of the identified monitoring pattern in the second RACH transmission.

Some examples of the method, apparatus, and non-transitory computer-readable medium described above may further include processes, features, means, or instructions for identifying beam identifiers of the two or more transmit beams, or time-frequency resources for the two or more transmit beams, or a combination thereof. Some examples of the method, apparatus, and non-transitory computer-readable medium described above may further include processes, features, means, or instructions for transmitting, in the second RACH transmission, an indication of the identified beam identifiers of the two or more transmit beams, or the time-frequency resources for the two or more transmit beams, or a combination thereof.

Some examples of the method, apparatus, and non-transitory computer-readable medium described above may further include processes, features, means, or instructions for transmitting synchronization signals, or reference signals, or a combination thereof. Some examples of the method, apparatus, and non-transitory computer-readable medium described above may further include processes, features, means, or instructions for receiving, from the UE and with the third RACH transmission, a beam report that may be based on the transmitted synchronization signals, or the transmitted reference signals, or a combination thereof.

Some examples of the method, apparatus, and non-transitory computer-readable medium described above may further include processes, features, means, or instructions for determining that the UE may be to transmit an acknowledgment to the base station responsive to a fourth RACH transmission. Some examples of the method, apparatus, and non-transitory computer-readable medium described above may further include processes, features, means, or instructions for transmitting, to the UE in response to the third RACH transmission, the fourth RACH transmission that includes an indication that the UE may be to transmit an acknowledgement using one or more transmit beams based on the determination.

In some examples of the method, apparatus, and non-transitory computer-readable medium described above, the indication that the UE may be to transmit the acknowledgement identifies the one or more transmit beams, or uplink control channel resources, or a combination thereof.

Some examples of the method, apparatus, and non-transitory computer-readable medium described above may further include processes, features, means, or instructions for identifying the one or more transmit beams based on the indication of the two or more transmit beams for the UE to use to transmit the third RACH transmission, or a beam report received in the third RACH transmission, or a combination thereof.

Some examples of the method, apparatus, and non-transitory computer-readable medium described above may further include processes, features, means, or instructions for transmitting the fourth RACH transmission on a plurality of transmit beams, where the fourth RACH transmission includes a group acknowledgment configuration. Some examples of the method, apparatus, and non-transitory computer-readable medium described above may further include processes, features, means, or instructions for receiving a group acknowledgment using the one or more transmit beams based on the group acknowledgment configuration.

Some examples of the method, apparatus, and non-transitory computer-readable medium described above may further include processes, features, means, or instructions for configuring, during a radio resource control (RRC) connection setup process, multiple-beam communications with the UE based on the received acknowledgment.

DETAILED DESCRIPTION

Figure 1:
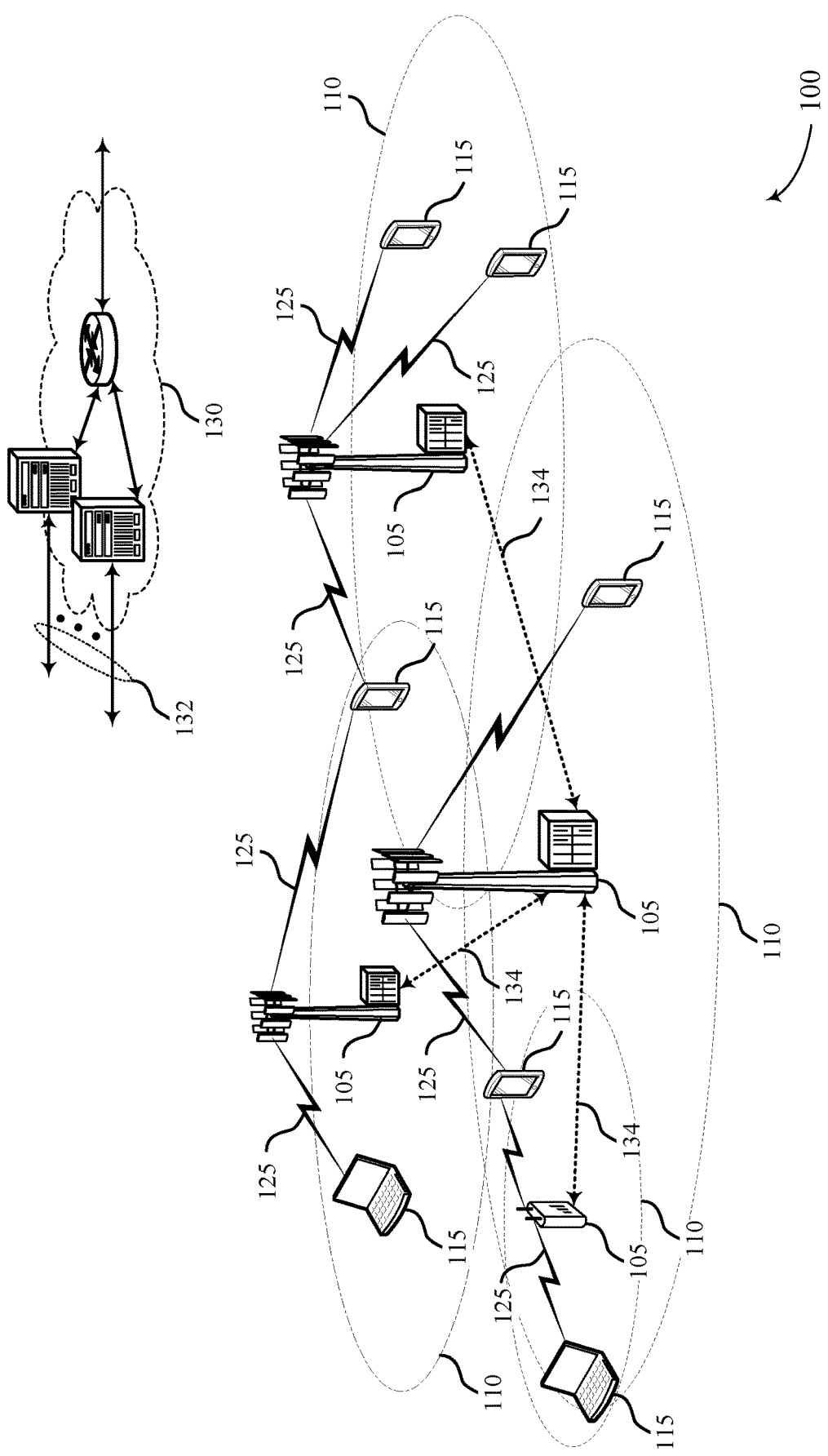
FIG. 1 illustrates an example of a system for wireless communication that supports multiple-beam uplink random access channel (RACH) messages in accordance with aspects of the present disclosure.

Some wireless communication systems may support beamformed transmissions between a base station and a user equipment (UE). For example, some systems may operate in millimeter wave (mmW) frequency ranges (e.g., 28 GHz, 40 GHz, 60 GHz, etc.). Wireless communication at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome path losses at these frequencies. A wireless device may use a number of antenna ports (e.g., 1, 2, 4, 8 antenna ports) associated with arrays of antennas to form beams in various directions using a number of analog weighting factors. For example, as a base station transmits downlink signals using directional transmit beams, a UE may also utilize beamforming for the UE's own directional receive beams and its uplink transmit beams for uplink transmissions to the base station. In some cases, when the UE has data to communicate with a network, the UE may utilize beamforming techniques for random access channel (RACH) transmissions for corresponding RACH messages to access the network prior to the data communications.

RACH procedures may include multiple RACH messages transmitted between the UE and the base station (e.g., the network) to establish network communications. The UE may transmit a first RACH message (e.g., RACH message 1) that includes a RACH preamble unique to the UE to differentiate from other UEs transmitting different RACH preambles (e.g., avoiding collisions). Subsequently, the base station may transmit a second RACH message (e.g., RACH message 2) that includes a random access response to provide the UE with an uplink resource grant, a timing advance, and a temporary cell radio network temporary identity (C-RNTI). The UE may then transmit a third RACH message (e.g., RACH message 3) that includes a radio resource control (RRC) connection request. The base station may respond with a fourth RACH message (i.e., RACH message 4) that includes a contention resolution message to proceed with the RRC setup.

In some cases, the base station may identify two or more beams, after receiving RACH message 1, that the UE may utilize for transmitting RACH message 3. For example, the beams may be derived from receive beams that the base station uses to receive RACH message 1. Additionally or alternatively, the beams may be identified through a reciprocal quasi co-location relationship with synchronization beams transmitted between the base station and the UE. The quasi co-location relationship of the beams may refer to a spatial relationship between the antenna ports (and corresponding beams) used to send respective transmissions. As an example, different antenna ports may be used by a base station for transmitting synchronization signals and for RACH transmissions to the UE. However, the channel properties for signals sent using the different antenna ports may be assumed to be the same (e.g., despite the signals being transmitted from different antenna ports) and the antenna ports (and their respective beams) may be determined to be quasi co-located with each other. In such cases, the UE may have respective antenna ports for receive beams used for receiving the synchronization signals and for RACH transmissions. Using a reciprocal quasi co-location relationship, a transmit beam of the UE (e.g., for sending RACH message 3) may be derived from a receive beam that the UE used to receive a synchronization signal (on a synchronization beam). The base station may signal the identified beams during RACH message 2, and the UE may then transmit RACH message 3 using the two or more identified beams. In turn, the base station may transmit RACH message 4 in response to RACH message 3, and the UE may respond with an acknowledgement message (ACK) for one or more beams, where the beams may be based on the identified beams in RACH message 2. The base station may use information from the RACH procedure, including the identified beams, to configure multiple beams during RRC connection setup. Accordingly, the use of multiple beams early in access processes performed by the UE and base station may enable robust transmissions and enhance communications between the devices.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various operations may be added, omitted, or combined. Also, features described with respect to some examples may be combined in some other examples.

Aspects of the disclosure are initially described in the context of a wireless communications system. A communication scheme for RACH messaging is also described. A process flow illustrating aspects of the disclosure is also described. Aspects of the disclosure are further illustrated by and described with reference to apparatus diagrams, system diagrams, and flowcharts that relate to multiple-beam uplink RACH messages.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices. Wireless communications system may support the use of multiple beam transmissions during random access procedures, such as when sending RACH transmissions to a base station following a transmission of a RACH preamble.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. After receiving the PSS and SSS, the UE 115 may receive a master information block (MIB), which may be transmitted in a physical broadcast channel (PBCH) by the base station 105. The MIB may contain system bandwidth information, a system frame number (SFN), and a physical hybrid automatic request (HARD) indicator channel (PHICH) configuration.

After decoding the MIB, the UE 115 may receive one or more system information blocks (SIBs). For example, a first SIB (SIB1) may contain cell access parameters and scheduling information for other SIBs. For instance, SIB1 may include access information, including cell identity information, and it may indicate whether a UE 115 is allowed to camp on a coverage area 110. SIB1 may also include cell selection information (or cell selection parameters) and scheduling information for other SIBs, such as a second SIB (SIB2). Decoding SIB1 may enable the UE 115 to receive SIB2, where SIB2 may contain RRC configuration information related to RACH procedures, paging, physical uplink control channel (PUCCH), physical uplink shared channel (PUSCH), power control, sounding reference signal (SRS), and cell barring. Different SIBs may be defined according to the type of system information conveyed. In some cases, SIB2 may be scheduled dynamically according to information in SIB1 and may include access information and parameters related to common and shared channels.

After decoding SIB2, the UE 115 may transmit a RACH preamble (e.g., in a RACH message 1) to a base station 105. For example, the RACH preamble may be randomly selected from a set of 64 predetermined sequences. Randomly selecting a predetermined sequence may enable the base station 105 to distinguish between multiple UEs 115 trying to access the system simultaneously. The base station 105 may respond with a random access response (e.g., in a RACH message 2) that provides an uplink resource grant, a timing advance, and a temporary C-RNTI. The UE 115 may then transmit an RRC connection request (e.g., in a RACH message 3) along with a temporary mobile subscriber identity (TMSI) (e.g., if the UE 115 has previously been connected to the same wireless network) or a random identifier. The RRC connection request may also indicate the reason the UE 115 is connecting to the network (e.g., emergency, signaling, data exchange, etc.). The base station 105 may respond to the connection request with a contention resolution message (e.g., in a RACH message 4) addressed to the UE 115, which may provide a new C-RNTI. If the UE 115 receives a contention resolution message with the correct identification, it may proceed with an RRC setup. If the UE 115 does not receive a contention resolution message (e.g., if there is a conflict with another UE 115), the UE 115 may repeat the RACH process by transmitting a new RACH preamble.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas.

Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from a base station 105, such as synchronization signals, reference signals, beam selection signals, or other control signals. For example, the receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples the receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

As described herein, the use of multiple beams may be implemented early in the cell random access process. For instance, the UE 115 may utilize multiple beams for one or more of the transmissions of the RRC connection process, where the base station 105 may provide an indication of the beams to use for a RACH transmission within the preceding random access response from base station 105, such as a second RACH transmission. Such techniques may enable robust transmission schemes for random access procedures, and may further lead to efficient communications between the base station 105 and UE 115 following the random access procedure. For example, the base station 105 may use information obtained during RRC connection setup to configure robust multiple beam communications with the UE 115 (e.g., to transmit ACKs using different beams, which beam was used due to mobility or a deployment type of the UE 115, etc.).

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s = 1/30{,}720{,}000$ seconds. Time intervals of a communications resource may be organized according to radio frames each having a duration of 10 milliseconds (ms), where the frame period may be expressed as $T_f = 307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing multiple carrier modulation (MCM) techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Wireless communications system 100 may support uplink RACH transmissions on multiple beams. For example, a UE 115 may transmit a random access preamble to a base station 105 in a first RACH transmission, and the base station 105 may respond with a random access response in a second RACH transmission. The second RACH transmission may include an indication for the UE 115 to use multiple transmit beams for a subsequent RACH transmission. For example, the base station 105 may identify two or more beams that the UE 115 may use for a third RACH transmission based on the reception of the first RACH transmission from the UE 115. The base station 105 may also indicate a beam index and/or time-frequency resources associated with each of the two or more beams. Using the indication received from the base station 105, the UE 115 may proceed to use the indicated two or more beams when sending the third RACH transmission (e.g., including an RRC connection request) to the base station 105. Upon receiving the third RACH transmission from the UE 115, the base station 105 may respond with a fourth RACH transmission (e.g., including a contention resolution message), which may further include an indication to the UE 115 to transmit an ACK (or a group ACK) using one or more beams.

Figure 2A:
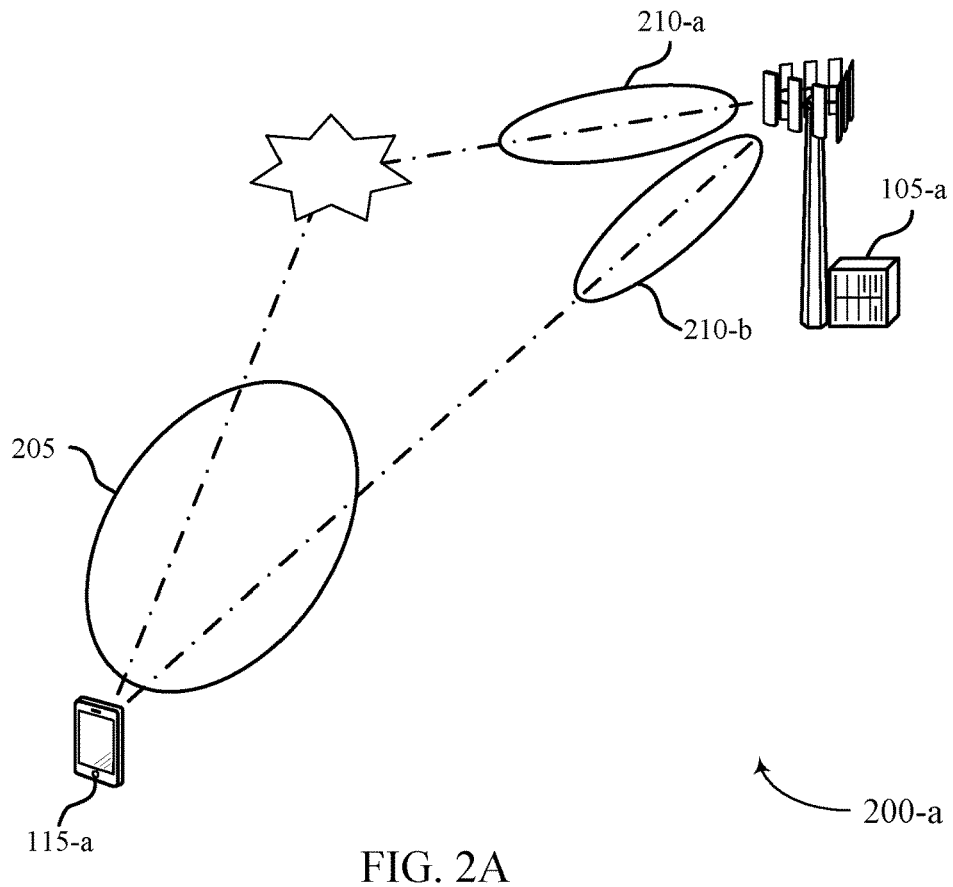
FIG. 2A-2B illustrates an example of a wireless communications system that supports multiple-beam uplink RACH messages in accordance with aspects of the present disclosure.
Figure 2B:
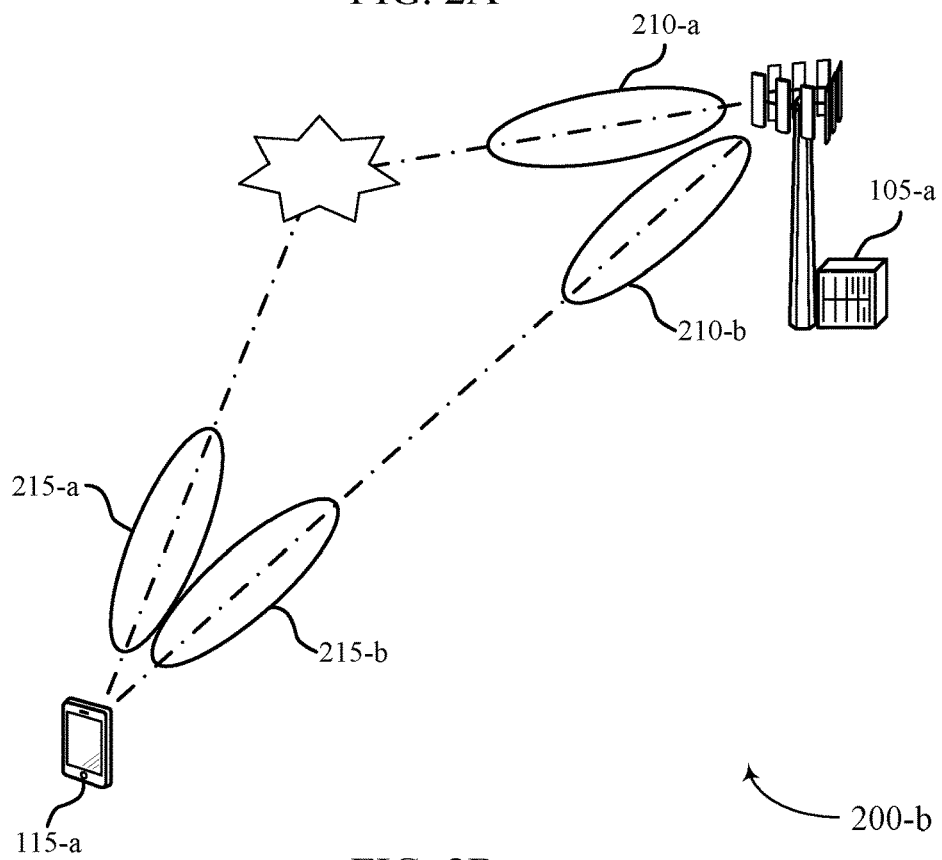

FIGS. 2A and 2B illustrate examples of wireless communications systems 200-a and 200-b that support multiple-beam uplink RACH messages in accordance with various aspects of the present disclosure. In some examples, wireless communications systems 200-a and 200-b may implement aspects of wireless communications system 100. Wireless communications systems 200-a and 200-b include a base station 105-a and a UE 115-a, which may be examples of base stations 105 and UEs 115 as described with reference to FIG. 1. Wireless communications systems 200-a and 200-b may illustrate a contention-based RACH procedure for enabling UE 115-a to access base station 105-a, where UE 115-a uses multiple transmit beams for sending RACH transmissions.

UE 115-a may use a RACH procedure when attempting to access base station 105-a for network communications. The RACH procedure may be shared by multiple UEs 115 attempting to connect to base station 105-a, resulting in a contention-based scenario (e.g., where collisions between the multiple UEs 115 may occur). For a contention-based RACH procedure, UE 115-a may first transmit a RACH preamble to base station 105-a after decoding a SIB2. This RACH preamble may be known as RACH message 1. To mitigate collisions between UEs 115 in the contention-based RACH procedure, UE 115-a may randomly select the RACH preamble from a set of 64 predetermined sequences. Randomly selecting the RACH preamble may enable base station 105-a to distinguish between the multiple UEs 115 trying to access the system simultaneously.

In some examples, UE 115-a may transmit RACH message 1 over a single directional transmit beam or pseudo-omni transmit beam 205 (e.g., a wide beam covering up to 120 degrees). Base station 105-a may identify multiple receive beams 210 that receive the RACH message 1 sent via pseudo-omni transmit beam 205. The identification of receive beams 210 may be based on the strength of the signal each receive beam 210 detects (e.g., during a beam sweep process). For example, base station 105-a may identify receive beam 210-a and receive beam 210-b that both receive the RACH message 1 from UE 115-a. After identifying receive beams 210, base station 105-a may assign a tag or identifier to each receive beam 210 (e.g., corresponding to "beam 1" for receive beam 210-a and "beam 2" for receive beam 210-b).

Receive beams 210 may correspond to multiple transmit beams that UE 115-a may utilize for RACH message 3 (e.g., the transmit beams for RACH message 3 may be derived from receive beams 210 used to receive RACH message 1). In some examples, base station 105-a may identify multiple transmit beams for subsequent RACH messages sent by UE 115-a, which may be based on various scenarios. For example, the selection of the transmit beams used by UE 115-a may be based on different deployments of UE 115-a (e.g., a high-speed deployment, such as on a high-speed train) or whether base station 105-a performs a beam refinement process during RACH message 1 transmissions (e.g., where base station 105-a attempts to identify other receive beams during reception).

Base station 105-a may respond to RACH message 1 with a random access response, or RACH message 2, that provides an uplink resource grant, a timing advance, and a C-RNTI to UE 115-a. Base station 105-a may signal the identified transmit beams during RACH message 2 to indicate on which beams UE 115-a may transmit RACH message 3. Additionally, RACH message 2 may include a trigger for UE 115-a to transmit a beam report (e.g., a beam report for synchronization signals or reference signals received from base station 105-a) in RACH message 3. In some cases, base station 105-a may further indicate a monitoring configuration within RACH message 2 for UE 115-a to utilize for a RACH message 4 (sent by base station 105-a). Base station 105-a may also request that UE 115-a transmit back reports of synchronization signal beams that receive the strongest synchronization signals as part of the RACH message 2 transmission. Alternatively, the beam report may be transmitted at a different time than the RACH message 2.

As illustrated in FIG. 2B, UE 115-a may further refine its pseudo-omni transmit beam 205, where two or more transmit beams 215 (e.g., transmit beams 215-a and 215-b) are used instead of pseudo-omni transmit beam 205. Transmit beams 215-a and 215-b may be derived from reception beams 210-a and 210-c, as indicated by base station 105-a in the RACH message 2. UE 115-a may then transmit an RRC connection request, or RACH message 3, along with a TMSI (if UE 115-a has previously been connected to the same wireless network) or a random identifier. The RRC connection request may also indicate the reason UE 115-a is connecting to the network (e.g., emergency, signaling, data exchange, etc.).

In some examples, base station 105-a may indicate a configuration of the two or more transmit beams 215 used by UE 115-a for RACH message 3, including the time/frequency resource for each transmit beam 215. In some cases, base station 105-a may signal the indication through a reciprocal quasi-colocation (QCL) relationship for the multiple transmit beams 215 used for transmitting RACH message 3, which may be derived from beams used for receiving synchronization signals from base station 105-a. UE 115-a may then transmit RACH message 3 utilizing the configured transmit beams 215-a and 215-b in the configured time/frequency resources (e.g., during configured slots) as indicated by base station 105-a. In some cases, UE 115-a may transmit RACH message 3 on the multiple transmit beams 215 over the same time/frequency resource. Alternatively, UE 115-a may transmit RACH message 3 on transmit beam 215-a during a first mini-slot and on transmit beam 215-b during a second, subsequent, mini-slot. As mentioned above, RACH message 3 may also include optional beam reports based on the synchronization signals or reference signals, if requested by base station 105-a. Additionally or alternatively, base station 105-a may configure a multiple beam monitoring pattern in RACH message 2 for UE 115-a to receive RACH message 4.

Following receipt of RACH message 3, base station 105-a may transmit RACH message 4, which may include an indication to UE 115-b to transmit an ACK message. Base station 105-a may transmit RACH message 4 indicating for UE 115-a to transmit the acknowledgement message on one or more beams with an indication of uplink PUCCH resources for the one or more beams. The one or more beams may be based on the indication included in RACH message 2 (e.g., transmit beams 215) or may be updated beams based on the beam reports transmitted in RACH message 3. In some examples, a group ACK configuration may be indicated if RACH message 4 is monitored in multiple beams, such that a single ACK may be transmitted for all signals on the multiple beams instead of an ACK for each signal on their respective beam. If UE 115-a receives RACH message 4, it may transmit an ACK in an uplink transmission. In some cases, base station 105-a may utilize the beams from the RACH messages during initial access to configure a multiple-beam robustness during RRC connection setup. For example, subsequent transmissions utilizing multiple-beam configurations may be enhanced through utilizing the beams and/or information determined through the RACH messaging.

Figure 3:
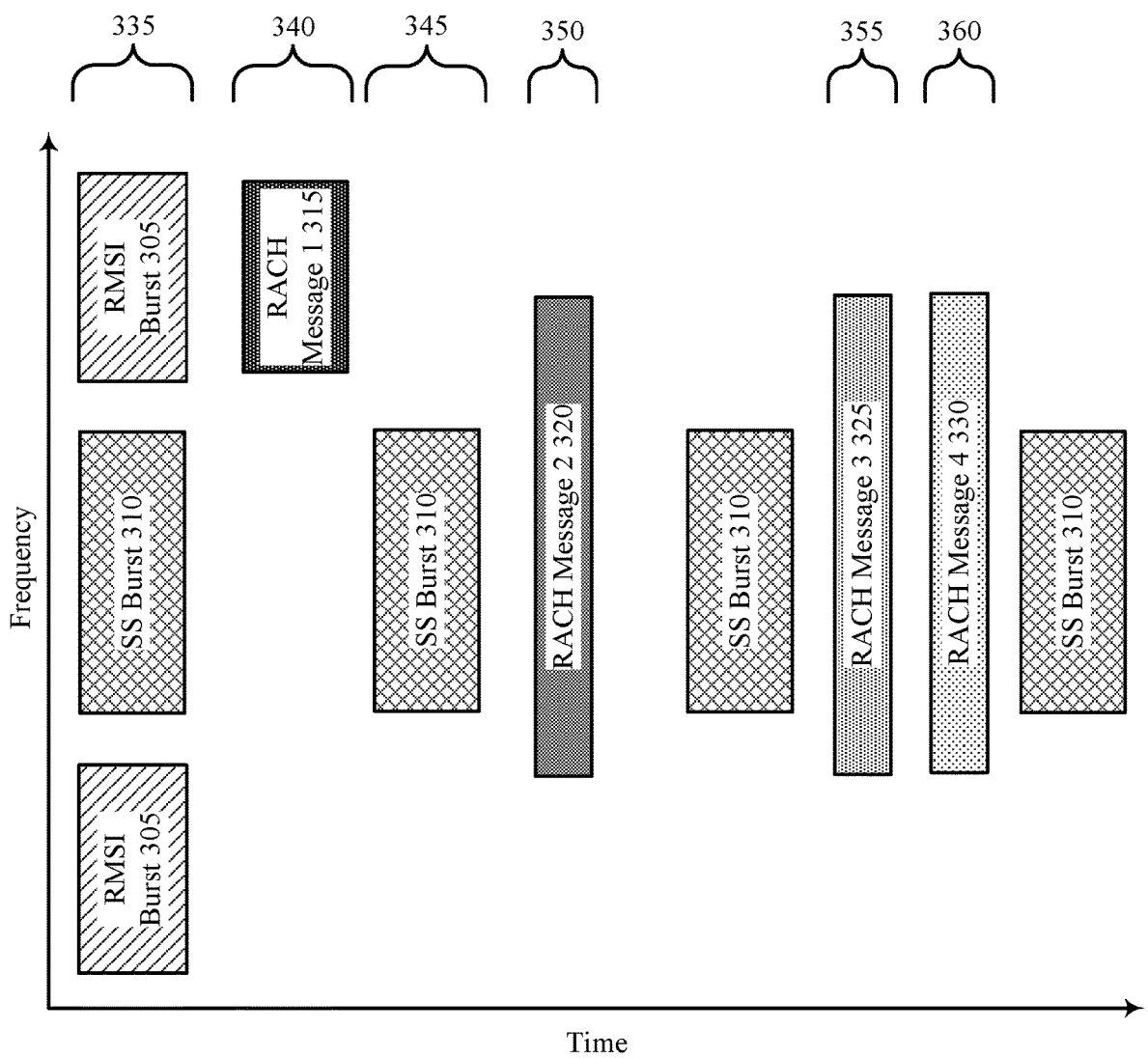
FIG. 3 illustrates an example of a communication scheme in a system that supports multiple-beam uplink RACH messages in accordance with aspects of the present disclosure.

FIG. 3 illustrates an example of a communication scheme 300 in a system that supports multiple-beam uplink RACH messages in accordance with various aspects of the present disclosure. In some examples, communication scheme 300 may implement aspects of wireless communications system 100, 200-a, and/or 200-b. Communication scheme 300 may include a random mobile subscriber identity (RMSI) burst 305, a synchronization signal burst 310, a RACH message 1 315, a RACH message 2 320, a RACH message 3 325, and a RACH message 4 330. Communication scheme 300 may represent a number of transmissions and received messages that a UE 115 may send or observe over a set of frequencies across an amount of time as described with reference to FIGS. 2A and 2B. Times 335, 340, 345, 350, 355, and, 360 may include one or more TTIs or slots for which messages are received or transmitted by the UE 115. Accordingly, the UE 115 may use communication scheme 300 when transmitting RACH message 2 320 (or any other subsequent RACH transmissions) using multiple transmit beams.

At time 335, the UE 115 may monitor the RMSI burst 305 and synchronization signal burst 310 from a base station 105 with a pseudo-omni beam (e.g., pseudo-omni beam 205 as described with reference to FIG. 2A). At time 340, the UE 115 may transmit RACH message 1 315 on the pseudo-omni beam. The base station 105 may receive RACH message 1 315 on one or more synchronization signal beams. Based on the beams used to receive RACH message 1 315, the base station may identify multiple beams for the UE 115 to use to transmit a subsequent RACH message transmission. In some cases, the base station 105 may perform beam refinement for a set of beams used to send synchronization signals while receiving RACH message 1 315. In such cases, the base station 105 may select a certain set of transmit beams for the UE 115 to use for the transmission of RACH message 3 325. In other cases, (e.g., based on a deployment of the UE 115) the base station 105 may identify multiple beams that may provide robust transmissions for the UE 115. In both cases, the base station 105 may indicate a beam index or identify the beams that are indicated to the UE 115 for use in transmitting RACH message 3.

At time 345, the UE 115 may perform a beam refinement during synchronization signal burst 310 within time 345. At time 350, the UE 115 may receive RACH message 2 320. RACH message 2 320 may include a random access response and an indication to send RACH message 3 325 on the multiple beams. In some cases, RACH message 3 325 may also include a configuration for a multiple beam monitoring pattern for the UE 115 to receive RACH message 4 330. At time 355, the UE 115 may transmit RACH message 3 325 on the multiple beams indicated in RACH message 2 320. Additionally, the UE 115 may, in some cases, include an synchronization signal report with or as part of RACH message 3 325. At time 360, the UE 115 may receive RACH message 4 330 from the base station 105 on the multiple beams identified.

Figure 4:
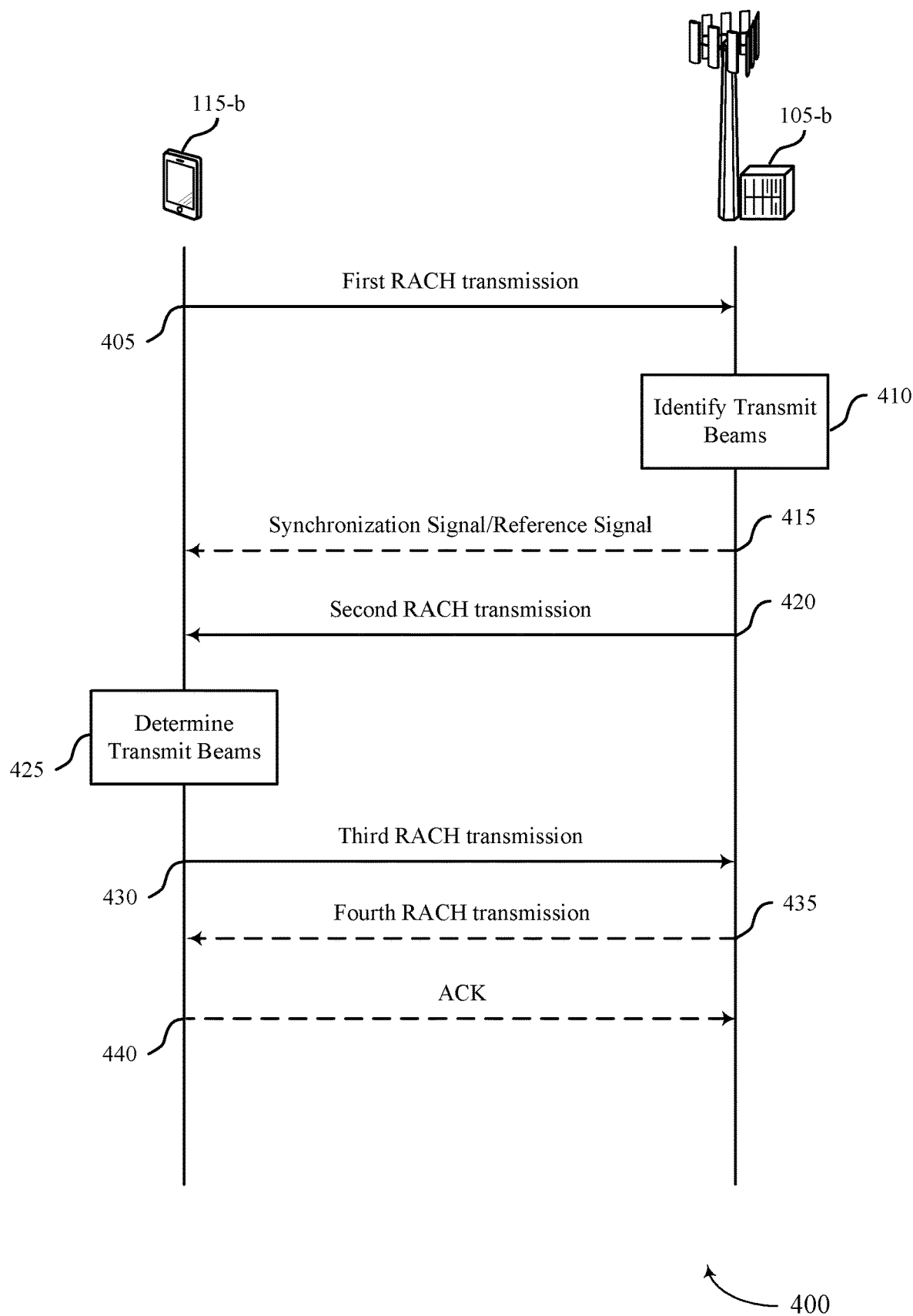
FIG. 4 illustrates an example of a process flow that supports multiple-beam uplink RACH messages in accordance with aspects of the present disclosure.

FIG. 4 illustrates an example of a process flow 400 in a system that supports multiple-beam uplink RACH messages in accordance with various aspects of the present disclosure. In some examples, process flow 400 may implement aspects of wireless communications systems 100, 200-a, and/or 200-b. Process flow 400 may include a base station 105-b and a UE 115-b, which may be examples of corresponding a corresponding base station 105 and a UE 115 as described above with reference to FIGS. 1-3. Process flow 400 may illustrate an example of the use of multiple transmit beams by UE 115-b for the transmission of RACH message 3.

In the following description of the process flow 400, the operations between the UE 115-b and the base station 105-b may be transmitted in a different order than the exemplary order shown, or the operations performed by UE 115-b and the base station 105-b may be performed in different orders or at different times. Certain operations may also be left out of the process flow 400, or other operations may be added to the process flow 400.

At 405, UE 115-b may transmit a first RACH transmission (e.g., including RACH message 1) to base station 105-b. The first RACH transmission may include a random access request. At 410, base station 105-b may identify two or more transmit beams for UE 115-b to transmit a third RACH transmission to base station 105-b. In some cases, identifying the two or more transmit beams may include determining a deployment type for UE 115-b (e.g., such as a deployment that includes a high amount of mobility or a high speed deployment) and selecting the two or more transmit beams based on the determined deployment type. In other cases, identifying the two or more transmit beams may include performing, while receiving the first RACH transmission, a beam refinement procedure for a plurality of beams used for transmitting synchronization signals and selecting the two or more transmit beams based on the performed beam refinement procedure. Base station 105-*b* may identify beam identifiers of the two or more transmit beams (e.g., beam indices identifying the transmit beams), or time-frequency resources for the two or more transmit beams, or a combination thereof. Additionally, base station 105-*b* may identify, based on the indication of the identified two or more transmit beams, a monitoring pattern associated with a plurality of beams for receiving a fourth RACH transmission.

At 415, base station 105-*b* may transmit synchronization signals (e.g., PSS, SSS, which may be NR-PSS or NR-SSS), or reference signals (e.g., DMRS, CSI-RS, and the like) and the like), or a combination thereof, after receiving the first RACH transmission. UE 115-*b* may perform a beam refinement procedure based on the received synchronization signals. At 420, base station 105-*b* may transmit, to UE 115-*b* and in response to the first RACH transmission at 405, a second RACH transmission (e.g., including RACH message 2) that includes an indication of the identified two or more transmit beams. The second RACH transmission may include a random access response. Base station 105-*b* may transmit, in the second RACH transmission, an indication of the identified beam identifiers of the two or more transmit beams, or the time-frequency resources for the two or more transmit beams, or a combination thereof. Additionally, base station 105-*b* may transmit an indication of the identified monitoring pattern in the second RACH transmission. UE 115-*b* may identify, based on the second RACH transmission received from the base station 105-*b*, a monitoring pattern for UE 115-*b* to use to receive a fourth RACH transmission.

At 425, UE 115-*b* may determine the two or more transmit beams for a third RACH transmission (e.g., including RACH message 3). The transmit beams may be based on the indication received in the second RACH message at 420. Additionally or alternatively, UE 115-*b* may identify receive beams used to receive synchronization signals from base station 105-*b* and determine the two or more transmit beams based on the receive beams. In some cases, UE 115-*b* may determine the two or more transmit beams based on a reciprocal QCL relationship between the receive beams and the two or more transmit beams.

At 430, UE 115-*b* may transmit the third RACH transmission to base station 105-*b* using the indicated two or more transmit beams. In some cases, UE 115-*b* may transmit, with the third RACH transmission, a beam report that is based on synchronization signals received by UE 115-*b*, or reference signals received by UE 115-*b*, or a combination thereof at 415. UE 115-*b* may transmit the third RACH transmission based on the performed beam refinement procedure after receiving the synchronization signals.

At 435, base station 105-*b* may transmit, in response to the third RACH transmission, a fourth RACH transmission (e.g., including RACH message 4). In some examples, base station 105-*b* may determine that UE 115-*b* is to transmit an ACK (or a group ACK or a block ACK (BA)) to base station 105-*b* responsive to the fourth RACH transmission. Accordingly, base station may include, in the fourth RACH transmission, an indication that UE 115-*b* is to transmit the acknowledgement, for example, using one or more transmit beams based on the determination. The indication that UE 115-*b* is to transmit the acknowledgement may identify the one or more transmit beams, or uplink control channel resources, or a combination thereof. Base station 105-*b* may identify the one or more transmit beams based on the indication of the two or more transmit beams for the UE to use to transmit the third RACH transmission, or a beam report received in the third RACH transmission, or a combination thereof.

In some cases, base station 105-*b* may transmit the fourth RACH transmission on a plurality of transmit beams, where the fourth RACH transmission includes a group ACK configuration. At 440, UE 115-*b* may transmit a group ACK to base station 105-*b* using the one or more transmit beams based on the group ACK configuration. Base station 105-*b* may configure, during an RRC connection setup process, multiple-beam communications with UE 115-*b* based on the received ACK.

Figure 5:
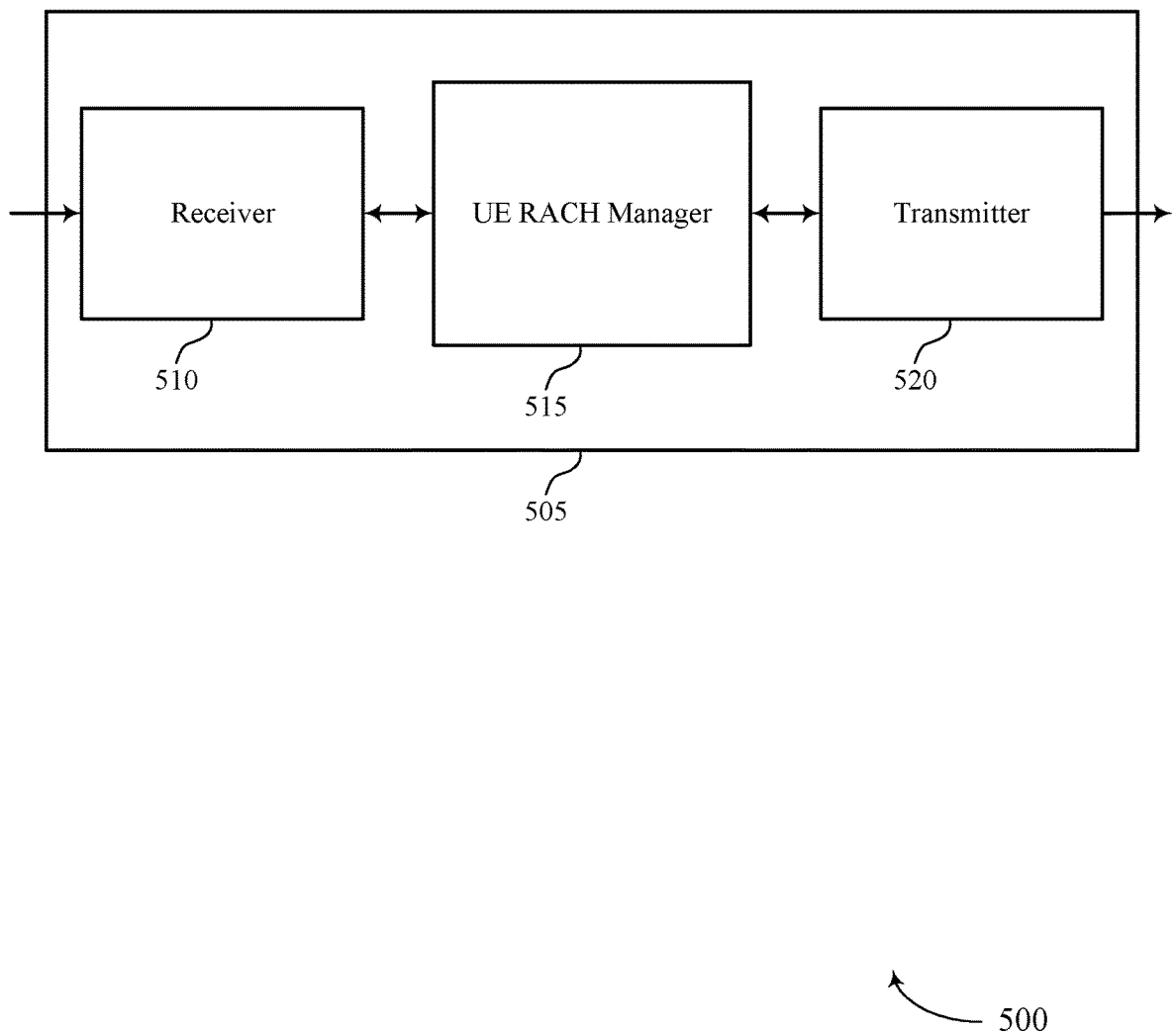
FIGS. 5 through 7 show block diagrams of a device that supports multiple-beam uplink RACH messages in accordance with aspects of the present disclosure.

FIG. 5 shows a block diagram 500 of a wireless device 505 that supports multiple-beam uplink RACH messages in accordance with aspects of the present disclosure. Wireless device 505 may be an example of aspects of a UE 115 as described herein. Wireless device 505 may include receiver 510, UE RACH manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to multiple-beam uplink RACH messages, etc.). Information may be passed on to other components of the device. The receiver 510 may be an example of aspects of the transceiver 835 described with reference to FIG. 8. The receiver 510 may utilize a single antenna or a set of antennas.

UE RACH manager 515 may be an example of aspects of the UE RACH manager 815 described with reference to FIG. 8. UE RACH manager 515 and/or at least some of its various sub-components may be implemented in hardware, software executed by a processor, firmware, or any combination thereof. If implemented in software executed by a processor, the functions of the UE RACH manager 515 and/or at least some of its various sub-components may be executed by a general-purpose processor, a digital signal processor (DSP), an application-specific integrated circuit (ASIC), an field-programmable gate array (FPGA) or other programmable logic device (PLD), discrete gate or transistor logic, discrete hardware components, or any combination thereof designed to perform the functions described in the present disclosure.

The UE RACH manager 515 and/or at least some of its various sub-components may be physically located at various positions, including being distributed such that portions of functions are implemented at different physical locations by one or more physical devices. In some examples, UE RACH manager 515 and/or at least some of its various sub-components may be a separate and distinct component in accordance with various aspects of the present disclosure. In other examples, UE RACH manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE RACH manager 515 may transmit a first RACH transmission to a base station. In some cases, UE RACH manager 515 may then receive, from the base station in response to the first RACH transmission, a second RACH transmission that includes an indication of two or more transmit beams for the UE 115 to use to transmit a third RACH transmission. Subsequently, UE RACH manager 515 may transmit the third RACH transmission to the base station using the indicated two or more transmit beams.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
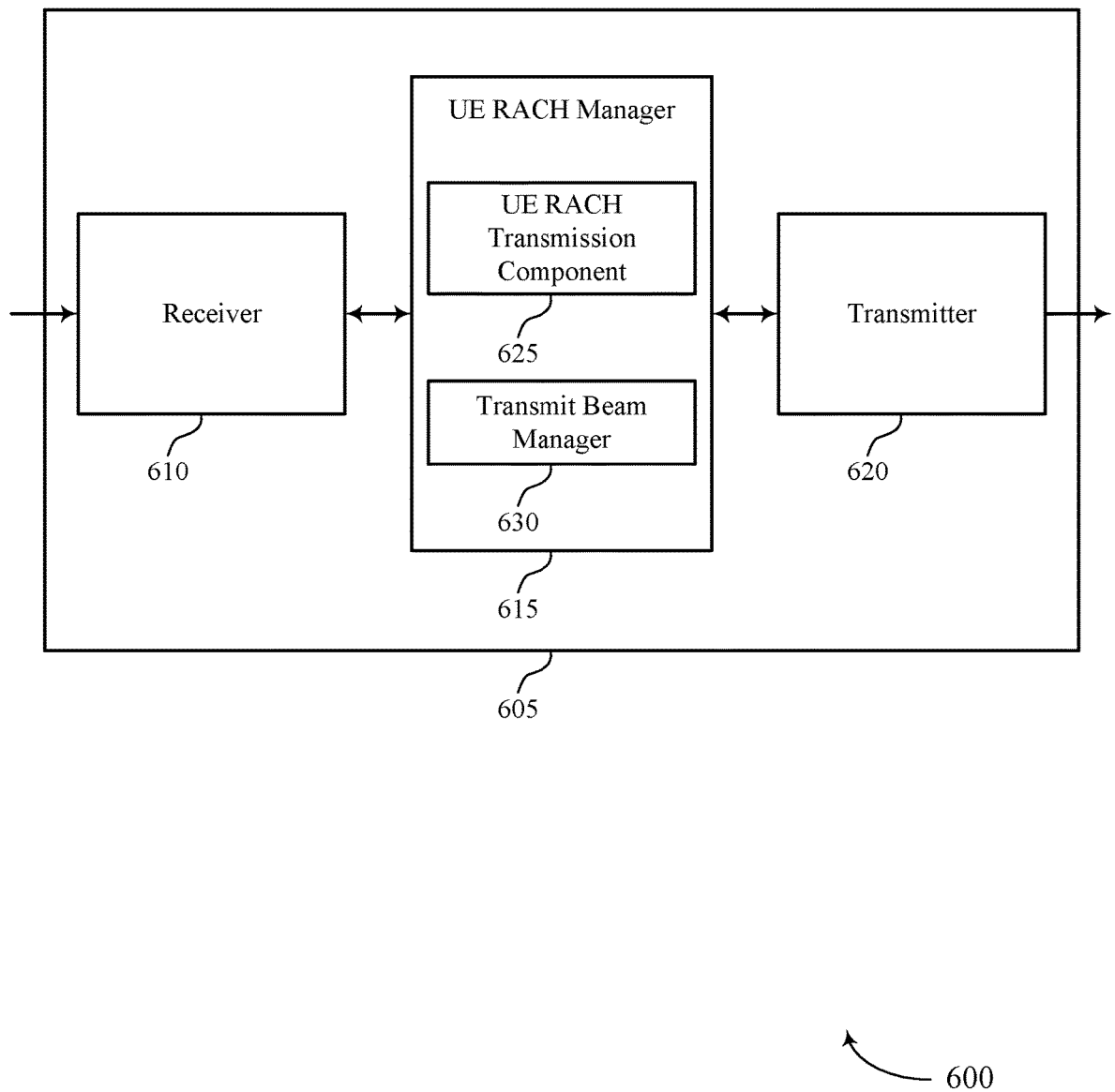

FIG. 6 shows a block diagram 600 of a wireless device 605 that supports multiple-beam uplink RACH messages in accordance with aspects of the present disclosure. Wireless device 605 may be an example of aspects of a wireless device 505 or a UE 115 as described with reference to FIG. 5. Wireless device 605 may include receiver 610, UE RACH manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to multiple-beam uplink RACH messages, etc.). Information may be passed on to other components of the device. The receiver 610 may be an example of aspects of the transceiver 835 described with reference to FIG. 8. The receiver 610 may utilize a single antenna or a set of antennas.

UE RACH manager 615 may be an example of aspects of the UE RACH manager 815 described with reference to FIG. 8. UE RACH manager 615 may also include UE RACH transmission component 625 and transmit beam manager 630.

UE RACH transmission component 625 may transmit a first RACH transmission to a base station and may also transmit a third RACH transmission to the base station 105 using two or more transmit beams (e.g., as indicated by a base station 105). In some examples, UE RACH transmission component 625 may transmit, with the third RACH transmission, a beam report that is based on synchronization signals received by the UE 115, or reference signals received by the UE 115, or a combination thereof. Additionally or alternatively, UE RACH transmission component 625 may transmit the third RACH transmission based on a performed beam refinement procedure. In some cases, the first RACH transmission includes a random access request. Additionally, the third RACH transmission may include an RRC connection request.

Transmit beam manager 630 may receive, from the base station 105 in response to the first RACH transmission, a second RACH transmission that includes an indication of two or more transmit beams for the UE to use to transmit a third RACH transmission. In some cases, transmit beam manager 630 may determine the two or more transmit beams based the receive beams. In some examples, transmit beam manager 630 may identify one or more transmit beams for sending an ACK (e.g., after receiving a fourth RACH transmission) based on the indication of the two or more transmit beams for the UE 115 to use to transmit the third RACH transmission. In some cases, the indication of the two or more transmit beams is based on a type of UE deployment. In some cases, the indication of the two or more transmit beams include beam identifiers of the two or more transmit beams, or time-frequency resources for the two or more transmit beams, or a combination thereof. In some cases, the second RACH transmission includes a random access response.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
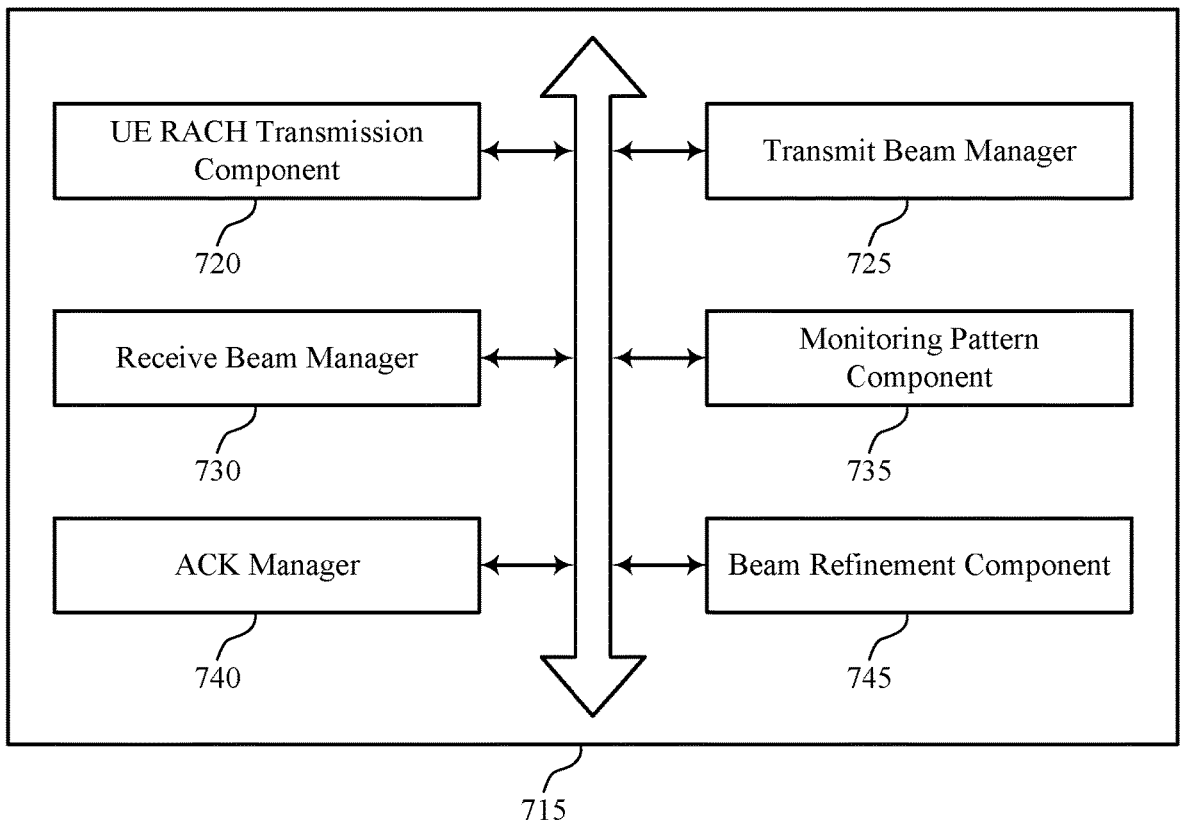

FIG. 7 shows a block diagram 700 of a UE RACH manager 715 that supports multiple-beam uplink RACH messages in accordance with aspects of the present disclosure. The UE RACH manager 715 may be an example of aspects of a UE RACH manager 515, a UE RACH manager 615, or a UE RACH manager 815 described with reference to FIGS. 5, 6, and 8. The UE RACH manager 715 may include UE RACH transmission component 720, transmit beam manager 725, receive beam manager 730, monitoring pattern component 735, ACK manager 740, and beam refinement component 745. Each of these modules may communicate, directly or indirectly, with one another (e.g., via one or more buses).

UE RACH transmission component 720 may transmit a first RACH transmission to a base station, and may also transmit a third RACH transmission to the base station 105 using two or more transmit beams (e.g., as indicated by a base station 105). In some examples, UE RACH transmission component 720 may transmit, with the third RACH transmission, a beam report that is based on synchronization signals received by the UE 115, or reference signals received by the UE 115, or a combination thereof. Additionally or alternatively, UE RACH transmission component 720 may transmit the third RACH transmission based on a performed beam refinement procedure. In some cases, the first RACH transmission includes a random access request. Additionally, the third RACH transmission may include an RRC connection request.

Transmit beam manager 725 may receive, from the base station 105 in response to the first RACH transmission, a second RACH transmission that includes an indication of two or more transmit beams for the UE to use to transmit a third RACH transmission. In some cases, transmit beam manager 725 may determine the two or more transmit beams based on the receive beams. In some examples, transmit beam manager 725 may identify one or more transmit beams for sending an ACK (e.g., after receiving a fourth RACH transmission) based on the indication of the two or more transmit beams for the UE 115 to use to transmit the third RACH transmission. In some cases, the indication of the two or more transmit beams is based on a type of UE deployment. In some cases, the indication of the two or more transmit beams include beam identifiers of the two or more transmit beams, or time-frequency resources for the two or more transmit beams, or a combination thereof. In some cases, the second RACH transmission includes a random access response.

Receive beam manager 730 may identify receive beams used by the UE 115 to receive synchronization signals from the base station 105. Monitoring pattern component 735 may identify, based on the second RACH transmission received from the base station 105, a monitoring pattern for the UE 115 to use to receive a fourth RACH transmission. In some cases, the monitoring pattern may identify a beam for receiving the fourth RACH transmission. Additionally or alternatively, monitoring pattern component 735 may receive the fourth RACH transmission on a set of beams, where the fourth RACH transmission includes a group ACK configuration.

ACK manager 740 may receive, from the base station 105 in response to the third RACH transmission, a fourth RACH transmission that includes an indication that the UE 115 is to transmit an acknowledgement to the base station 105 using one or more transmit beams and transmit a group ACK using the one or more transmit beams based on the group ACK configuration. In some cases, the indication that the UE 115 is to transmit the acknowledgement to the base station 105 identifies the one or more transmit beams, or uplink control channel resources, or a combination thereof. Beam refinement component 745 may receive synchronization signals from the base station after transmitting the first RACH transmission and perform a beam refinement procedure based on the received synchronization signals.

Figure 8:
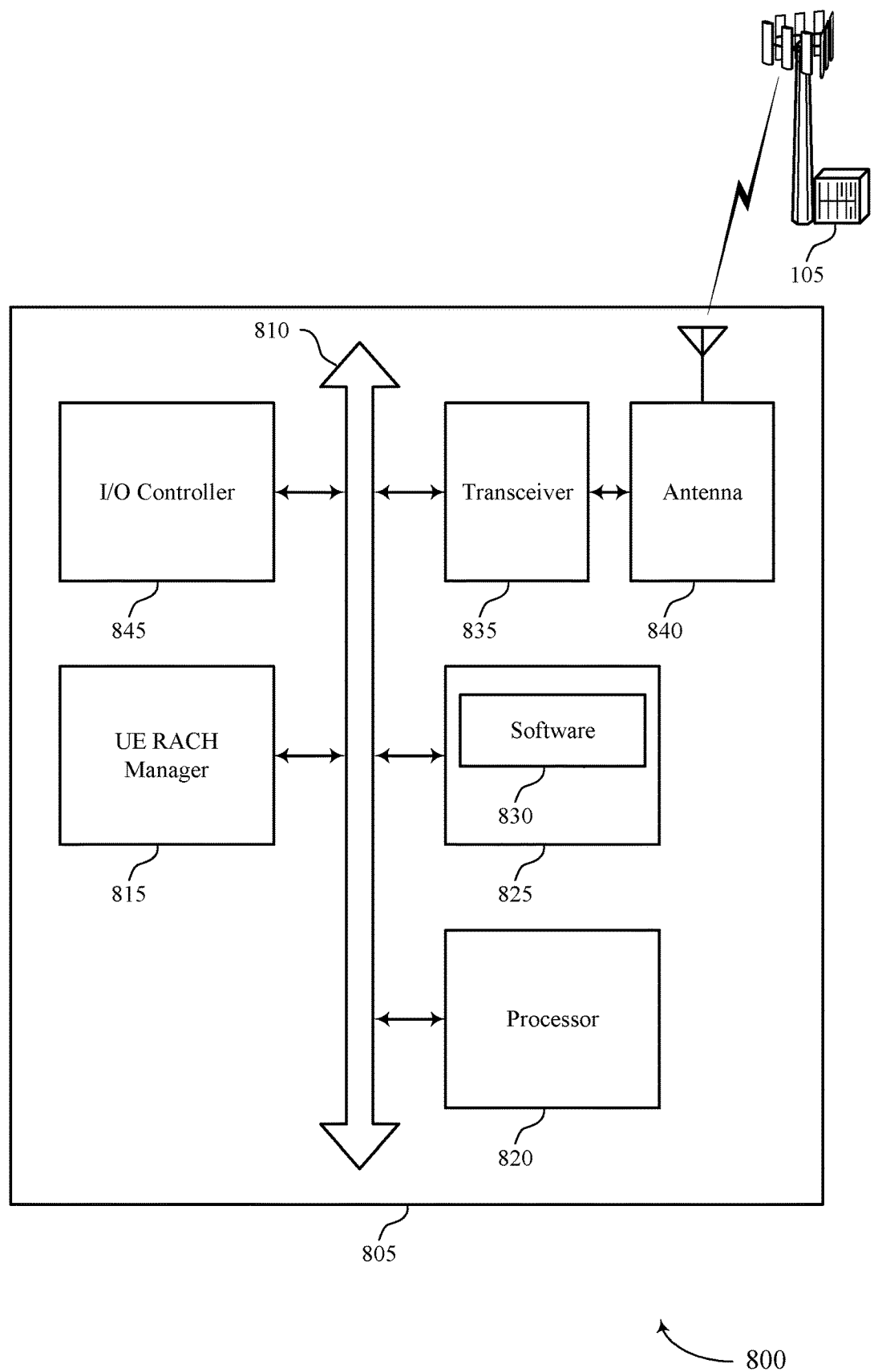
FIG. 8 illustrates a block diagram of a system including a UE that supports multiple-beam uplink RACH messages in accordance with aspects of the present disclosure.

FIG. 8 shows a diagram of a system 800 including a device 805 that supports multiple-beam uplink RACH messages in accordance with aspects of the present disclosure. Device 805 may be an example of or include the components of wireless device 505, wireless device 605, or a UE 115 as described above, e.g., with reference to FIGS. 5 and 6. Device 805 may include components for bi-directional voice and data communications including components for transmitting and receiving communications, including UE RACH manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting multiple-beam uplink RACH messages).

Memory 825 may include random-access memory (RAM) and read-only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support multiple-beam uplink RACH messages. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas. In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
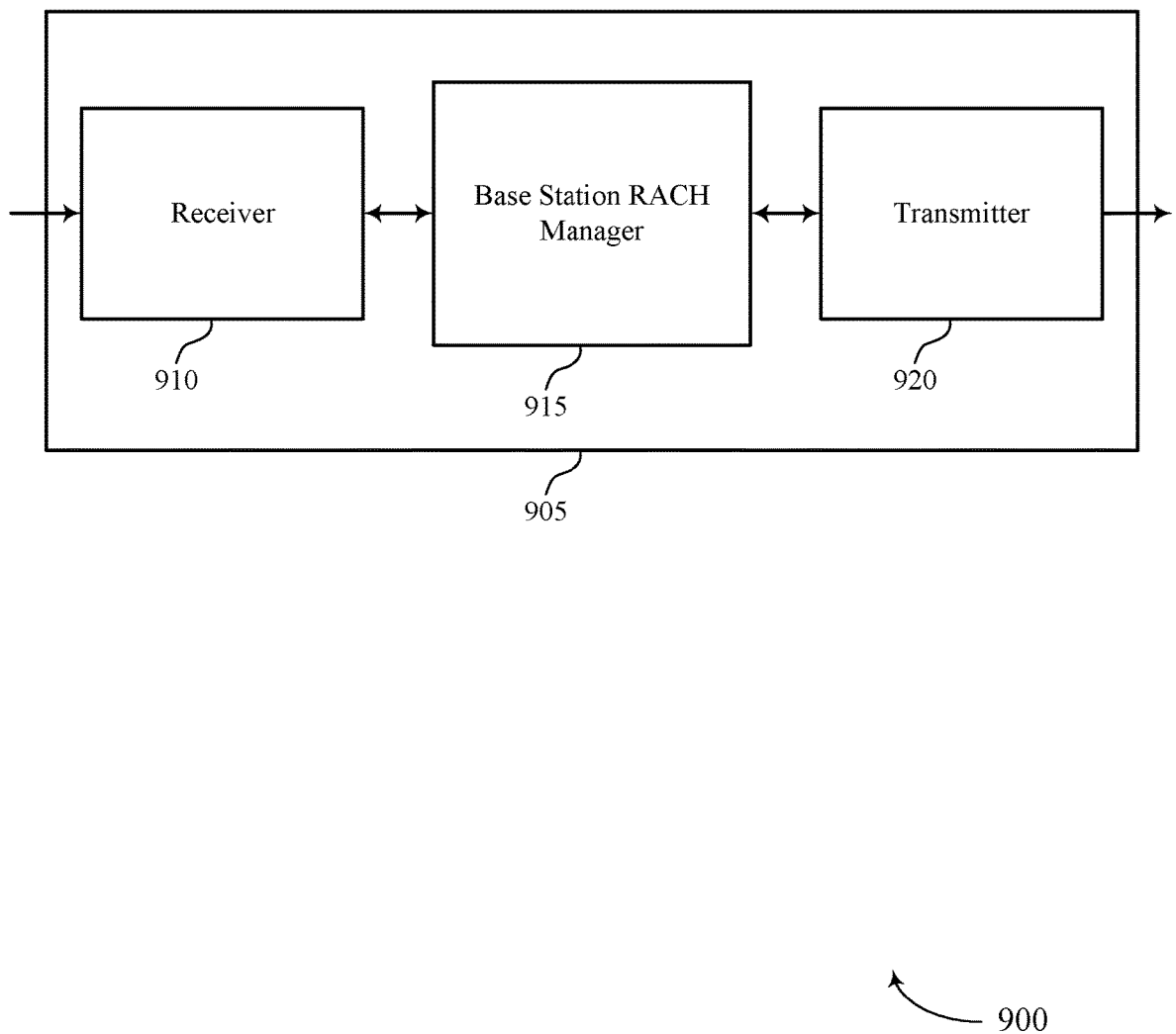
FIGS. 9 through 11 show block diagrams of a device that supports multiple-beam uplink RACH messages in accordance with aspects of the present disclosure.

FIG. 9 shows a block diagram 900 of a wireless device 905 that supports multiple-beam uplink RACH messages in accordance with aspects of the present disclosure. Wireless device 905 may be an example of aspects of a base station 105 as described herein. Wireless device 905 may include receiver 910, base station RACH manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to multiple-beam uplink RACH messages, etc.). Information may be passed on to other components of the device. The receiver 910 may be an example of aspects of the transceiver 1235 described with reference to FIG. 12. The receiver 910 may utilize a single antenna or a set of antennas.

Base station RACH manager 915 may be an example of aspects of the base station RACH manager 1215 described with reference to FIG. 12. Base station RACH manager 915 and/or at least some of its various sub-components may be implemented in hardware, software executed by a processor, firmware, or any combination thereof. If implemented in software executed by a processor, the functions of the base station RACH manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station RACH manager 915 and/or at least some of its various sub-components may be physically located at various positions, including being distributed such that portions of functions are implemented at different physical locations by one or more physical devices.

In some examples, base station RACH manager 915 and/or at least some of its various sub-components may be a separate and distinct component in accordance with various aspects of the present disclosure. In other examples, base station RACH manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station RACH manager 915 may receive a first RACH transmission from a UE. In some cases, based on the first RACH message, base station RACH manager 915 may identify two or more transmit beams for the UE to use to transmit a third RACH transmission to the base station. Subsequently, base station RACH manager 915 may transmit, to the UE in response to the first RACH transmission, a second RACH transmission that includes an indication of the identified two or more transmit beams. Base station RACH manager 915 may then receive the third RACH transmission from the UE in response to the second RACH transmission.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
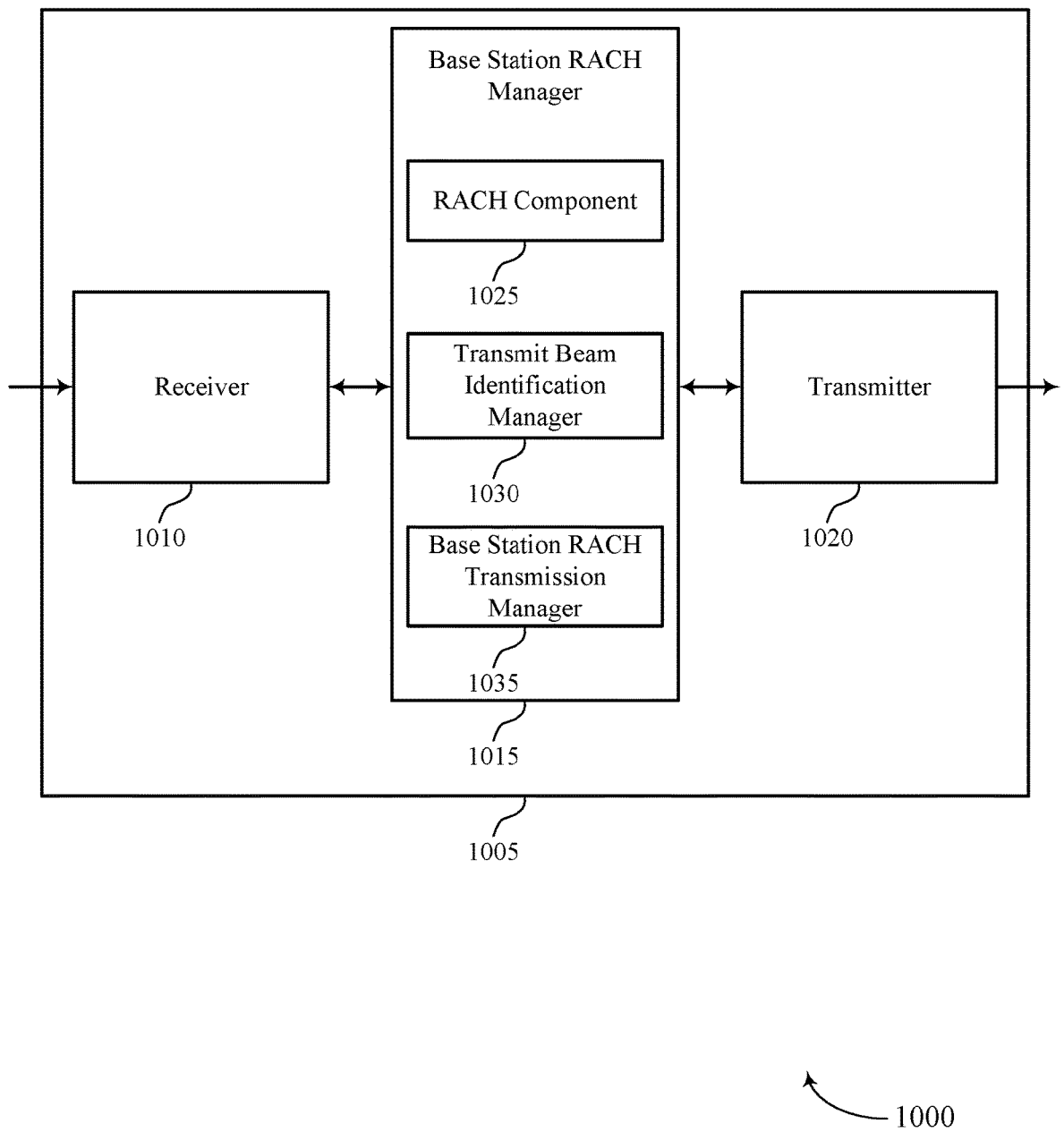

FIG. 10 shows a block diagram 1000 of a wireless device 1005 that supports multiple-beam uplink RACH messages in accordance with aspects of the present disclosure. Wireless device 1005 may be an example of aspects of a wireless device 905 or a base station 105 as described with reference to FIG. 9. Wireless device 1005 may include receiver 1010, base station RACH manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to multiple-beam uplink RACH messages, etc.). Information may be passed on to other components of the device. The receiver 1010 may be an example of aspects of the transceiver 1235 described with reference to FIG. 12. The receiver 1010 may utilize a single antenna or a set of antennas.

Base station RACH manager 1015 may be an example of aspects of the base station RACH manager 1215 described with reference to FIG. 12. Base station RACH manager 1015 may also include RACH component 1025, transmit beam identification manager 1030, and base station RACH transmission manager 1035.

RACH component 1025 may receive a first RACH transmission from a UE 115, and may further receive a third RACH transmission from the UE 115 in response to a second RACH transmission. In some cases, RACH component 1025 may receive, from the UE 115 and with the third RACH transmission, a beam report that is based on the transmitted synchronization signals, or the transmitted reference signals, or a combination thereof. In some examples, RACH component 1025 may configure, during an RRC connection setup process, multiple-beam communications with the UE based on the received ACK.

Transmit beam identification manager 1030 may identify two or more transmit beams for the UE 115 to use to transmit a third RACH transmission to the base station 105. In some examples, transmit beam identification manager 1030 may select the two or more transmit beams based on the determined deployment type. Additionally or alternatively, transmit beam identification manager 1030 may select the two or more transmit beams based on the performed beam refinement procedure. In some cases, transmit beam identification manager 1030 may identify the one or more transmit beams based on the indication of the two or more transmit beams for the UE 115 to use to transmit the third RACH transmission, or a beam report received in the third RACH transmission, or a combination thereof. In some cases, identifying the two or more transmit beams includes determining a deployment type for the UE 115.

Base station RACH transmission manager 1035 may transmit, to the UE 115 in response to the first RACH transmission, a second RACH transmission that includes an indication of the identified two or more transmit beams. In some cases, base station RACH transmission manager 1035 may transmit an indication of an identified monitoring pattern in the second RACH transmission. Additionally, base station RACH transmission manager 1035 may transmit, in the second RACH transmission, an indication of the identified beam identifiers of the two or more transmit beams, or the time-frequency resources for the two or more transmit beams, or a combination thereof. Base station RACH transmission manager 1035 may transmit, to the UE 115 in response to the third RACH transmission, a fourth RACH transmission that includes an indication that the UE 115 is to transmit an acknowledgement using one or more transmit beams based on the determination. The fourth RACH transmission may be transmitted on a set of transmit beams by base station RACH transmission manager 1035, and the fourth RACH transmission may include a group ACK configuration.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
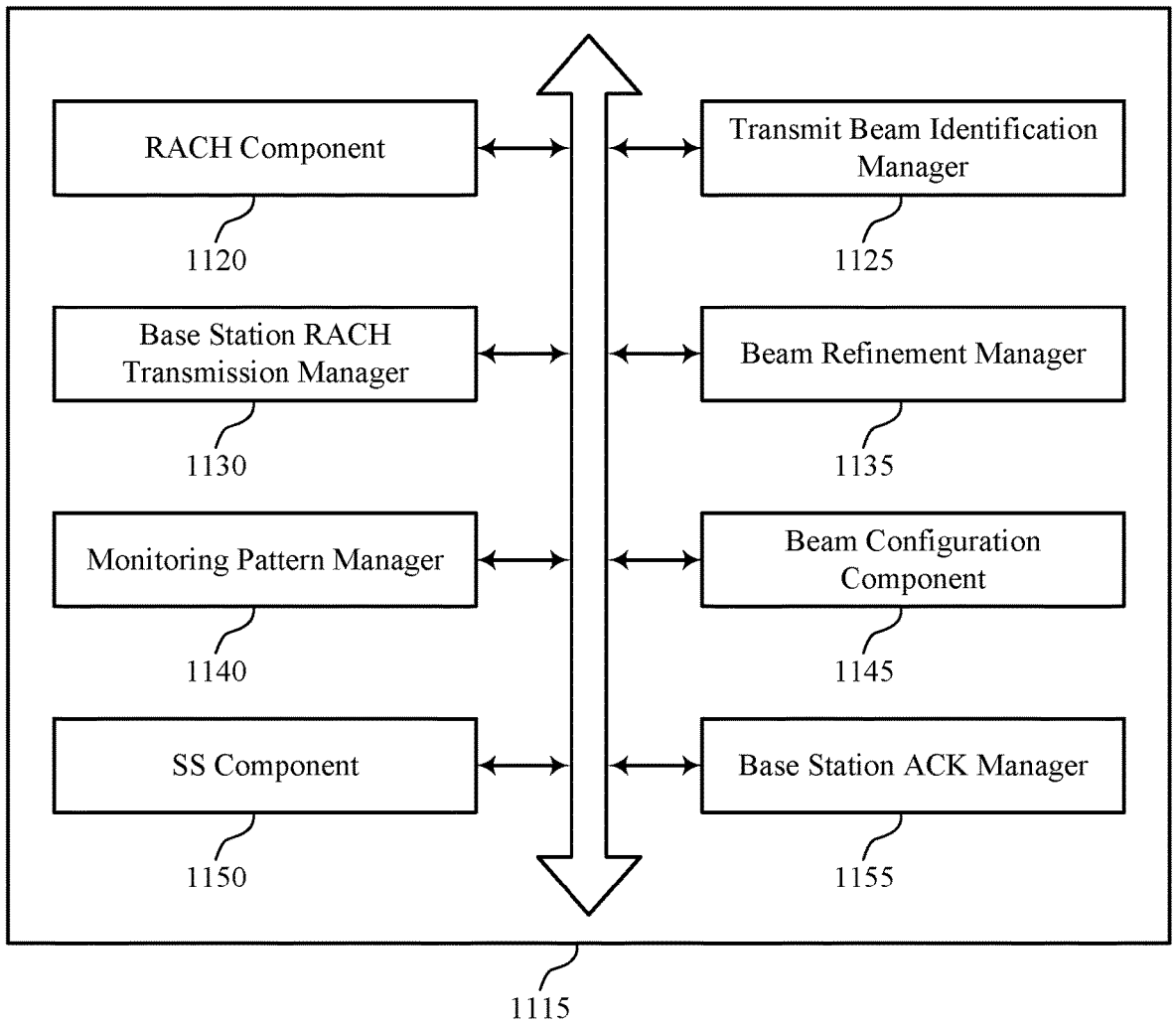

FIG. 11 shows a block diagram 1100 of a base station RACH manager 1115 that supports multiple-beam uplink RACH messages in accordance with aspects of the present disclosure. The base station RACH manager 1115 may be an example of aspects of a base station RACH manager 1215 described with reference to FIGS. 9, 10, and 12. The base station RACH manager 1115 may include RACH component 1120, transmit beam identification manager 1125, base station RACH transmission manager 1130, beam refinement manager 1135, monitoring pattern manager 1140, beam configuration component 1145, synchronization signal (SS) component 1150, and base station ACK manager 1155. Each of these modules may communicate, directly or indirectly, with one another (e.g., via one or more buses).

RACH component 1120 may receive a first RACH transmission from a UE 115, and may further receive a third RACH transmission from the UE 115 in response to a second RACH transmission. In some cases, RACH component 1120 may receive, from the UE 115 and with the third RACH transmission, a beam report that is based on the transmitted synchronization signals, or the transmitted reference signals, or a combination thereof. In some examples, RACH component 1120 may configure, during a RRC connection setup process, multiple-beam communications with the UE based on the received ACK.

Transmit beam identification manager 1125 may identify two or more transmit beams for the UE 115 to use to transmit a third RACH transmission to the base station 105. In some examples, transmit beam identification manager 1125 may select the two or more transmit beams based on the determined deployment type. Additionally or alternatively, transmit beam identification manager 1125 may select the two or more transmit beams based on the performed beam refinement procedure. In some cases, transmit beam identification manager 1125 may identify the one or more transmit beams based on the indication of the two or more transmit beams for the UE 115 to use to transmit the third RACH transmission, or a beam report received in the third RACH transmission, or a combination thereof. In some cases, identifying the two or more transmit beams includes determining a deployment type for the UE 115.

Base station RACH transmission manager 1130 may transmit, to the UE 115 in response to the first RACH transmission, a second RACH transmission that includes an indication of the identified two or more transmit beams. In some cases, base station RACH transmission manager 1130 may transmit an indication of an identified monitoring pattern in the second RACH transmission. Additionally, base station RACH transmission manager 1130 may transmit, in the second RACH transmission, an indication of the identified beam identifiers of the two or more transmit beams, or the time-frequency resources for the two or more transmit beams, or a combination thereof. Base station RACH transmission manager 1130 may transmit, to the UE 115 in response to the third RACH transmission, a fourth RACH transmission that includes an indication that the UE 115 is to transmit an acknowledgement using one or more transmit beams based on the determination. The fourth RACH transmission may be transmitted on a set of transmit beams by base station RACH transmission manager 1130, and the fourth RACH transmission may include a group ACK configuration.

Beam refinement manager 1135 may perform, while receiving the first RACH transmission, a beam refinement procedure for a set of beams used for transmitting synchronization signals. Monitoring pattern manager 1140 may identify, based on the indication of the identified two or more transmit beams, a monitoring pattern associated with a set of beams for receiving a fourth RACH transmission. Beam configuration component 1145 may identify beam identifiers of the two or more transmit beams, or time-frequency resources for the two or more transmit beams, or a combination thereof. SS component 1150 may transmit synchronization signals, or reference signals, or a combination thereof.

Base station ACK manager 1155 may determine that the UE 115 is to transmit an ACK to the base station 105 responsive to a fourth RACH transmission and receive a group ACK using the one or more transmit beams based on the group ACK configuration. In some cases, the indication that the UE 115 is to transmit the acknowledgement identifies the one or more transmit beams, or uplink control channel resources, or a combination thereof.

Figure 12:
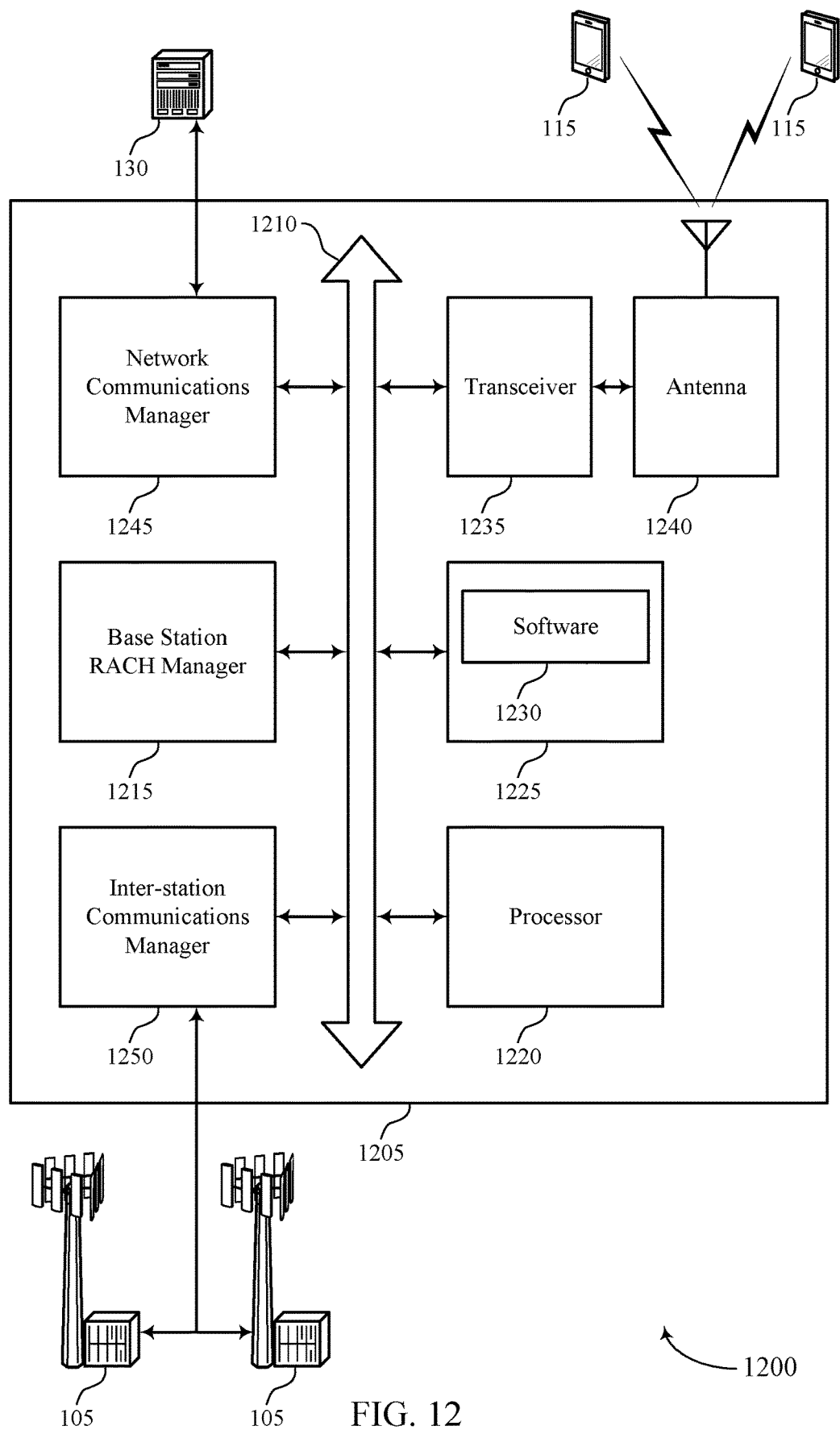
FIG. 12 illustrates a block diagram of a system including a base station that supports multiple-beam uplink RACH messages in accordance with aspects of the present disclosure.

FIG. 12 shows a diagram of a system 1200 including a device 1205 that supports multiple-beam uplink RACH messages in accordance with aspects of the present disclosure. Device 1205 may be an example of or include the components of base station 105 as described above, e.g., with reference to FIG. 1. Device 1205 may include components for bi-directional voice and data communications including components for transmitting and receiving communications, including base station RACH manager 1215, processor 1220, memory 1225, software 1230, transceiver 1235, antenna 1240, network communications manager 1245, and inter-station communications manager 1250. These components may be in electronic communication via one or more buses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting multiple-beam uplink RACH messages).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support multiple-beam uplink RACH messages. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions. Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base station 105, and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within an LTE/LTE-A wireless communication network technology to provide communication between base stations 105.

Figure 13:
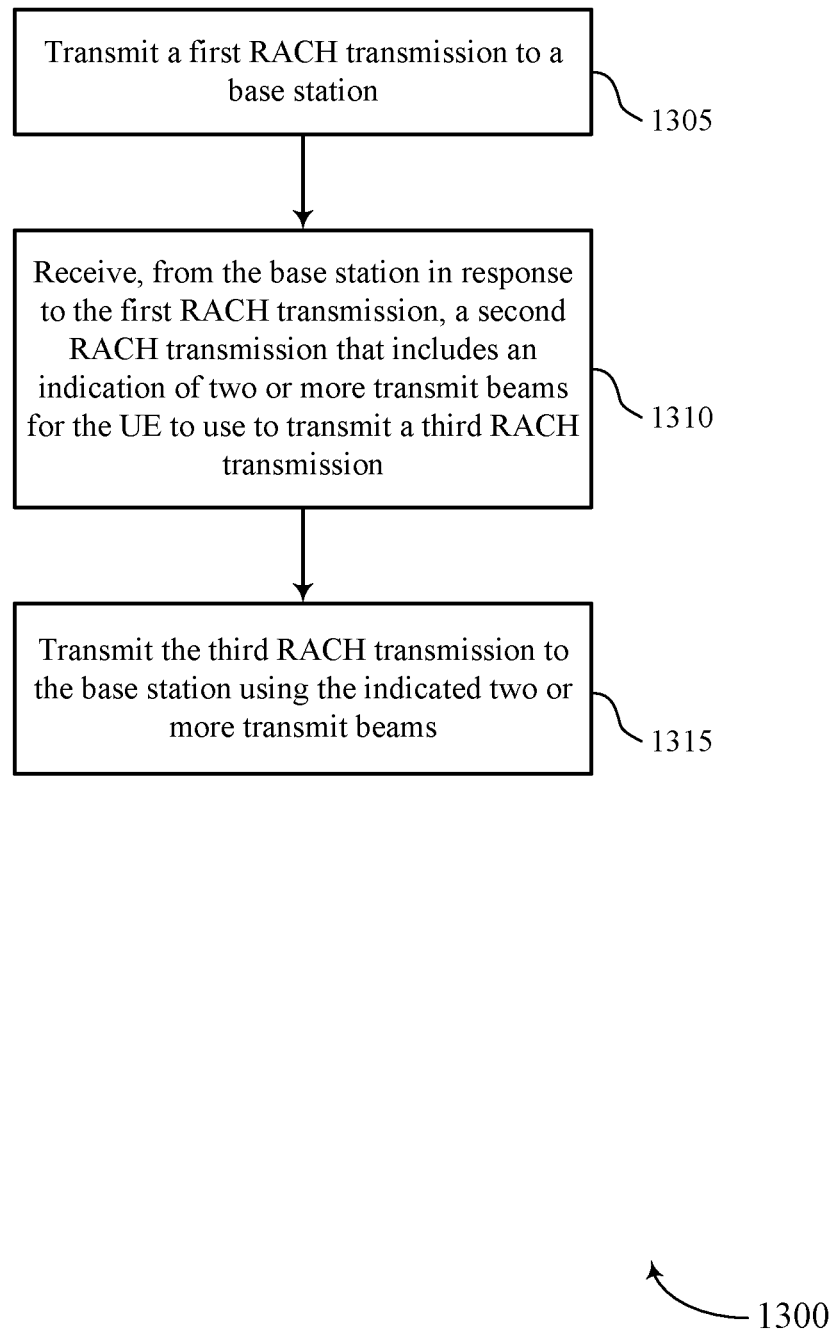
FIGS. 13 through 18 illustrate methods for multiple-beam uplink RACH messages in accordance with aspects of the present disclosure.

FIG. 13 shows a flowchart illustrating a method 1300 for multiple-beam uplink RACH messages in accordance with aspects of the present disclosure. The operations of method 1300 may be implemented by a UE 115 or its components as described herein. For example, the operations of method 1300 may be performed by a UE RACH manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1305 the UE 115 may transmit a first RACH transmission to a base station 105. The operations of block 1305 may be performed according to the methods described herein. In certain examples, aspects of the operations of block 1305 may be performed by a UE RACH transmission component as described with reference to FIGS. 5 through 8.

At block 1310 the UE 115 may receive, from the base station 105 in response to the first RACH transmission, a second RACH transmission that includes an indication of two or more transmit beams for the UE 115 to use to transmit a third RACH transmission. The operations of block 1310 may be performed according to the methods described herein. In certain examples, aspects of the operations of block 1310 may be performed by a transmit beam manager as described with reference to FIGS. 5 through 8.

At block 1315 the UE 115 may transmit the third RACH transmission to the base station 105 using the indicated two or more transmit beams. The operations of block 1315 may be performed according to the methods described herein. In certain examples, aspects of the operations of block 1315 may be performed by a UE RACH transmission component as described with reference to FIGS. 5 through 8.

Figure 14:
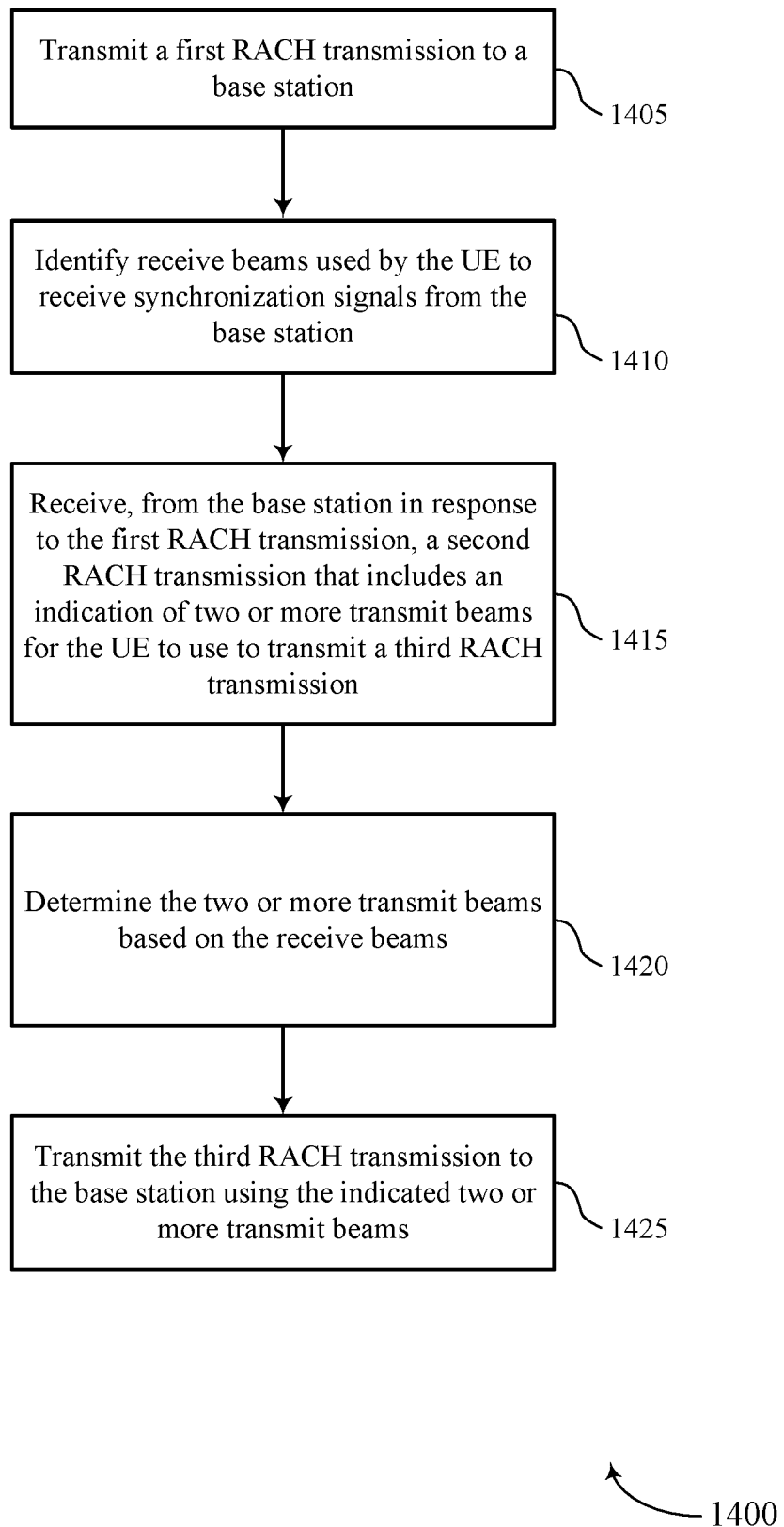

FIG. 14 shows a flowchart illustrating a method 1400 for multiple-beam uplink RACH messages in accordance with aspects of the present disclosure. The operations of method 1400 may be implemented by a UE 115 or its components as described herein. For example, the operations of method 1400 may be performed by a UE RACH manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may transmit a first RACH transmission to a base station 105. The operations of block 1405 may be performed according to the methods described herein. In certain examples, aspects of the operations of block 1405 may be performed by a UE RACH transmission component as described with reference to FIGS. 5 through 8.

At block 1410 the UE 115 may identify receive beams used by the UE 115 to receive synchronization signals from the base station 105. The operations of block 1410 may be performed according to the methods described herein. In certain examples, aspects of the operations of block 1410 may be performed by a receive beam manager as described with reference to FIGS. 5 through 8.

At block 1415 the UE 115 may receive, from the base station 105 in response to the first RACH transmission, a second RACH transmission that includes an indication of two or more transmit beams for the UE 115 to use to transmit a third RACH transmission. The operations of block 1415 may be performed according to the methods described herein. In certain examples, aspects of the operations of block 1415 may be performed by a transmit beam manager as described with reference to FIGS. 5 through 8.

At block 1420 the UE 115 may determine the two or more transmit beams based on the receive beams. The operations of block 1420 may be performed according to the methods described herein. In certain examples, aspects of the operations of block 1420 may be performed by a transmit beam manager as described with reference to FIGS. 5 through 8.

At block 1425 the UE 115 may transmit the third RACH transmission to the base station 105 using the indicated two or more transmit beams. The operations of block 1425 may be performed according to the methods described herein. In certain examples, aspects of the operations of block 1425 may be performed by a UE RACH transmission component as described with reference to FIGS. 5 through 8.

Figure 15:
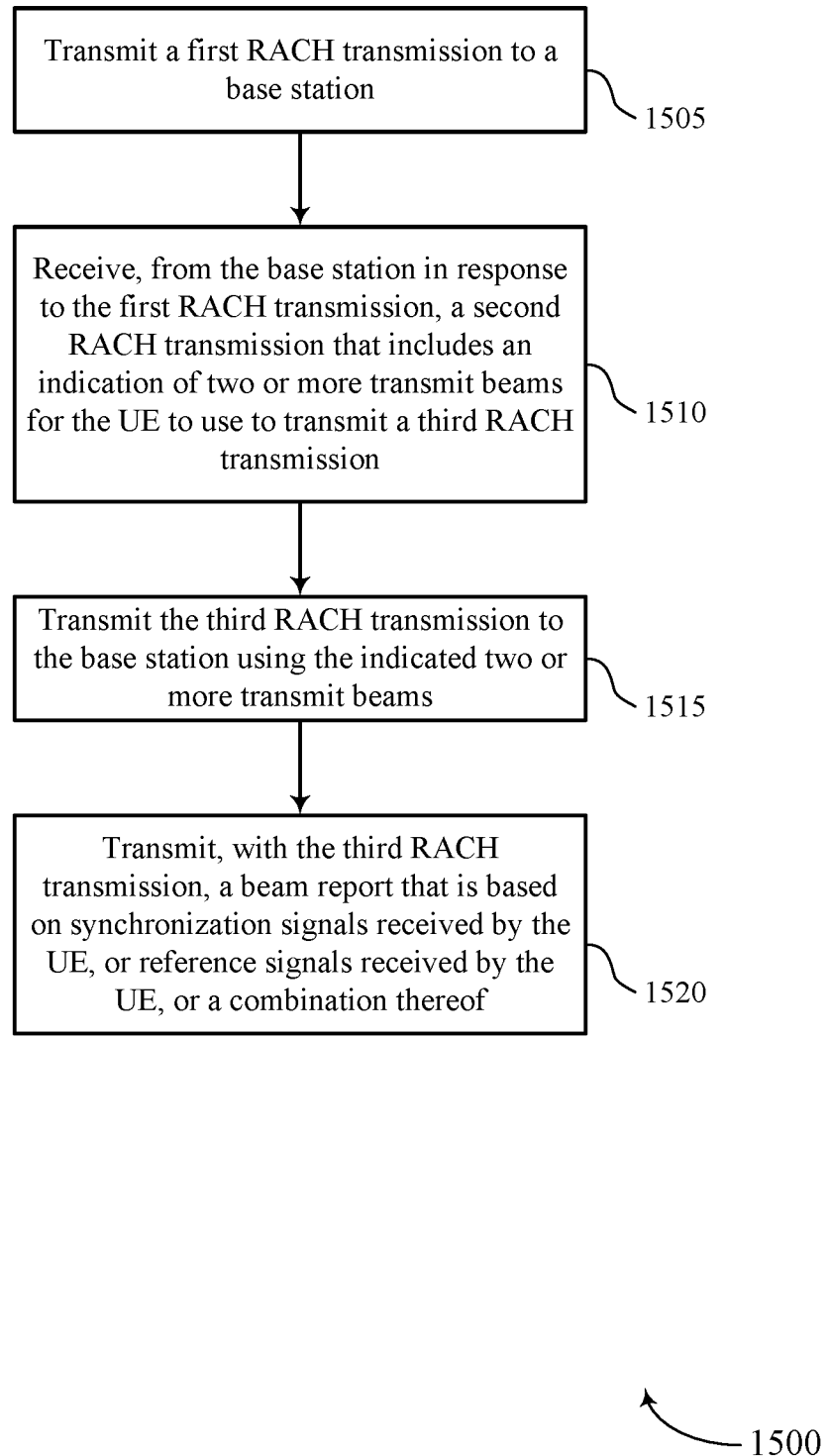

FIG. 15 shows a flowchart illustrating a method 1500 for multiple-beam uplink RACH messages in accordance with aspects of the present disclosure. The operations of method 1500 may be implemented by a UE 115 or its components as described herein. For example, the operations of method 1500 may be performed by a UE RACH manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may transmit a first RACH transmission to a base station 105. The operations of block 1505 may be performed according to the methods described herein. In certain examples, aspects of the operations of block 1505 may be performed by a UE RACH transmission component as described with reference to FIGS. 5 through 8.

At block 1510 the UE 115 may receive, from the base station 105 in response to the first RACH transmission, a second RACH transmission that includes an indication of two or more transmit beams for the UE 115 to use to transmit a third RACH transmission. The operations of block 1510 may be performed according to the methods described herein. In certain examples, aspects of the operations of block 1510 may be performed by a transmit beam manager as described with reference to FIGS. 5 through 8.

At block 1515 the UE 115 may transmit the third RACH transmission to the base station 105 using the indicated two or more transmit beams. The operations of block 1515 may be performed according to the methods described herein. In certain examples, aspects of the operations of block 1515 may be performed by a UE RACH transmission component as described with reference to FIGS. 5 through 8.

At block 1520 the UE 115 may transmit, with the third RACH transmission, a beam report that is based on synchronization signals received by the UE 115, or reference signals received by the UE, or a combination thereof. The operations of block 1520 may be performed according to the methods described herein. In certain examples, aspects of the operations of block 1520 may be performed by a UE RACH transmission component as described with reference to FIGS. 5 through 8.

Figure 16:
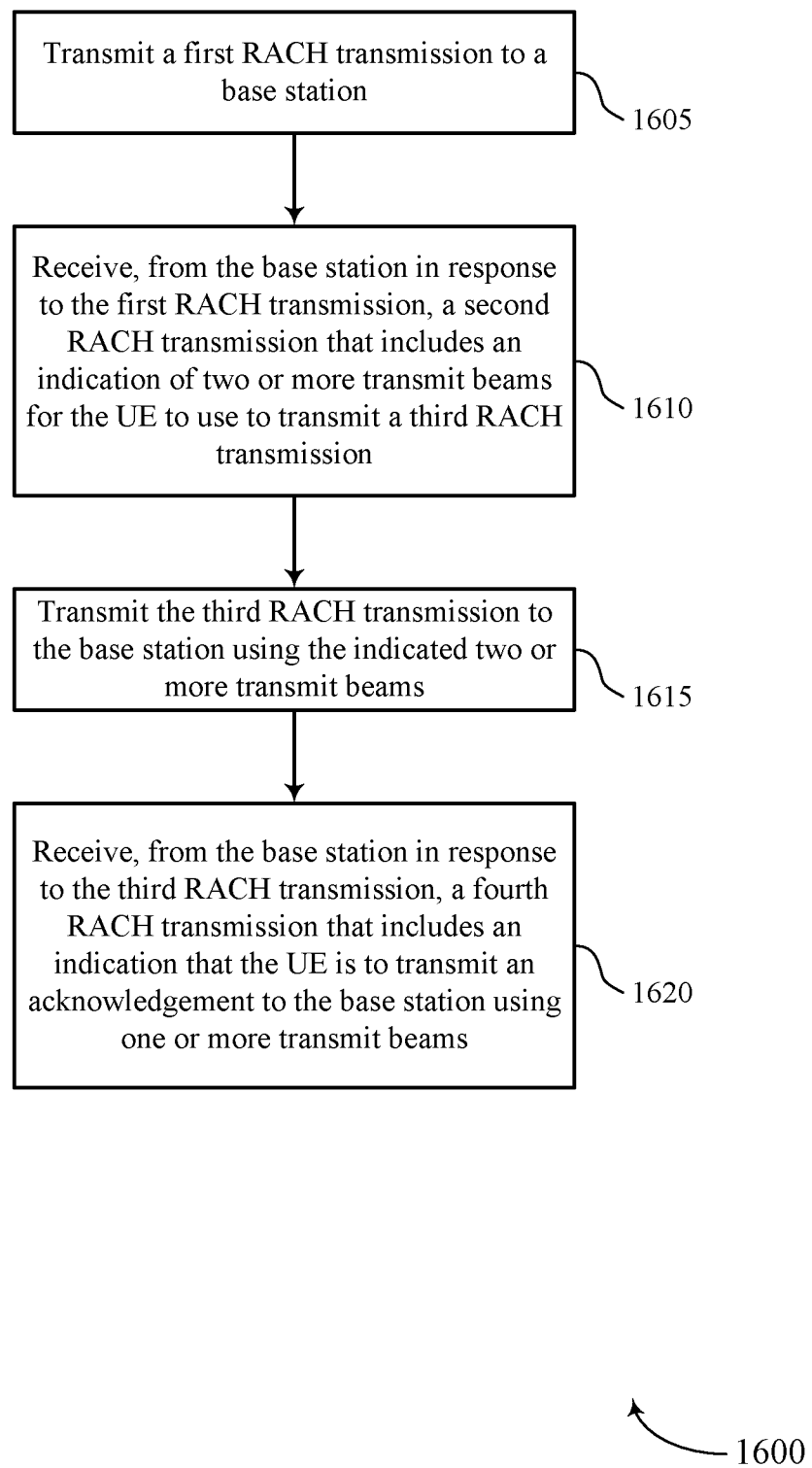

FIG. 16 shows a flowchart illustrating a method 1600 for multiple-beam uplink RACH messages in accordance with aspects of the present disclosure. The operations of method 1600 may be implemented by a UE 115 or its components as described herein. For example, the operations of method 1600 may be performed by a UE RACH manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may transmit a first RACH transmission to a base station 105. The operations of block 1605 may be performed according to the methods described herein. In certain examples, aspects of the operations of block 1605 may be performed by a UE RACH transmission component as described with reference to FIGS. 5 through 8.

At block 1610 the UE 115 may receive, from the base station 105 in response to the first RACH transmission, a second RACH transmission that includes an indication of two or more transmit beams for the UE 115 to use to transmit a third RACH transmission. The operations of block 1610 may be performed according to the methods described herein. In certain examples, aspects of the operations of block 1610 may be performed by a transmit beam manager as described with reference to FIGS. 5 through 8.

At block 1615 the UE 115 may transmit the third RACH transmission to the base station 105 using the indicated two or more transmit beams. The operations of block 1615 may be performed according to the methods described herein. In certain examples, aspects of the operations of block 1615 may be performed by a UE RACH transmission component as described with reference to FIGS. 5 through 8.

At block 1620 the UE 115 may receive, from the base station 105 in response to the third RACH transmission, a fourth RACH transmission that includes an indication that the UE 115 is to transmit an acknowledgement to the base station 105 using one or more transmit beams. The operations of block 1620 may be performed according to the methods described herein. In certain examples, aspects of the operations of block 1620 may be performed by a ACK manager as described with reference to FIGS. 5 through 8.

Figure 17:
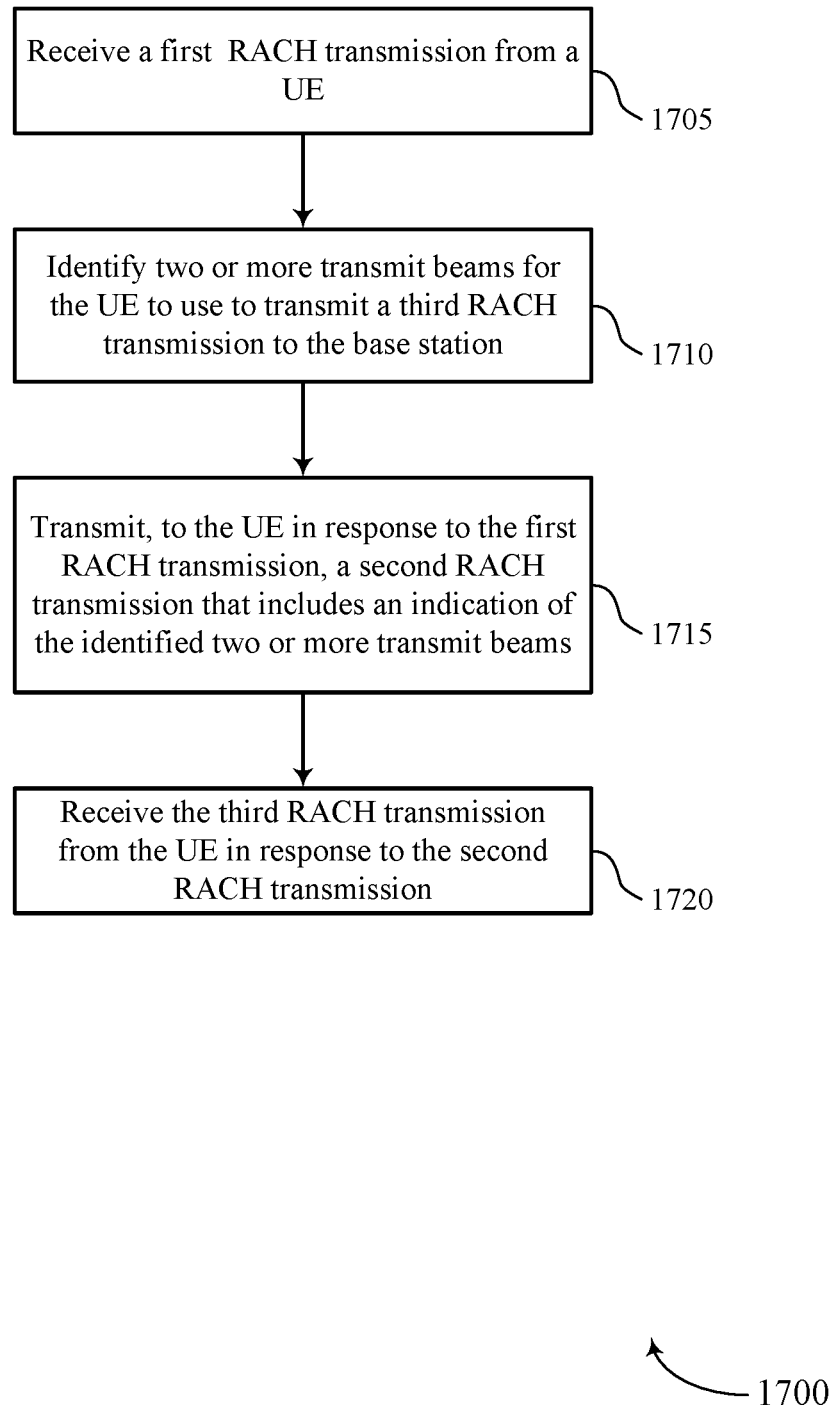

FIG. 17 shows a flowchart illustrating a method 1700 for multiple-beam uplink RACH messages in accordance with aspects of the present disclosure. The operations of method 1700 may be implemented by a base station 105 or its components as described herein. For example, the operations of method 1700 may be performed by a base station RACH manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 1705 the base station 105 may receive a first RACH transmission from a UE 115. The operations of block 1705 may be performed according to the methods described herein. In certain examples, aspects of the operations of block 1705 may be performed by a RACH component as described with reference to FIGS. 9 through 12.

At block 1710 the base station 105 may identify two or more transmit beams for the UE 115 to use to transmit a third RACH transmission to the base station. The operations of block 1710 may be performed according to the methods described herein. In certain examples, aspects of the operations of block 1710 may be performed by a transmit beam identification manager as described with reference to FIGS. 9 through 12.

At block 1715 the base station 105 may transmit, to the UE 115 in response to the first RACH transmission, a second RACH transmission that includes an indication of the identified two or more transmit beams. The operations of block 1715 may be performed according to the methods described herein. In certain examples, aspects of the operations of block 1715 may be performed by a base station RACH transmission manager as described with reference to FIGS. 9 through 12.

At block 1720 the base station 105 may receive the third RACH transmission from the UE 115 in response to the second RACH transmission. The operations of block 1720 may be performed according to the methods described herein. In certain examples, aspects of the operations of block 1720 may be performed by a RACH component as described with reference to FIGS. 9 through 12.

Figure 18:
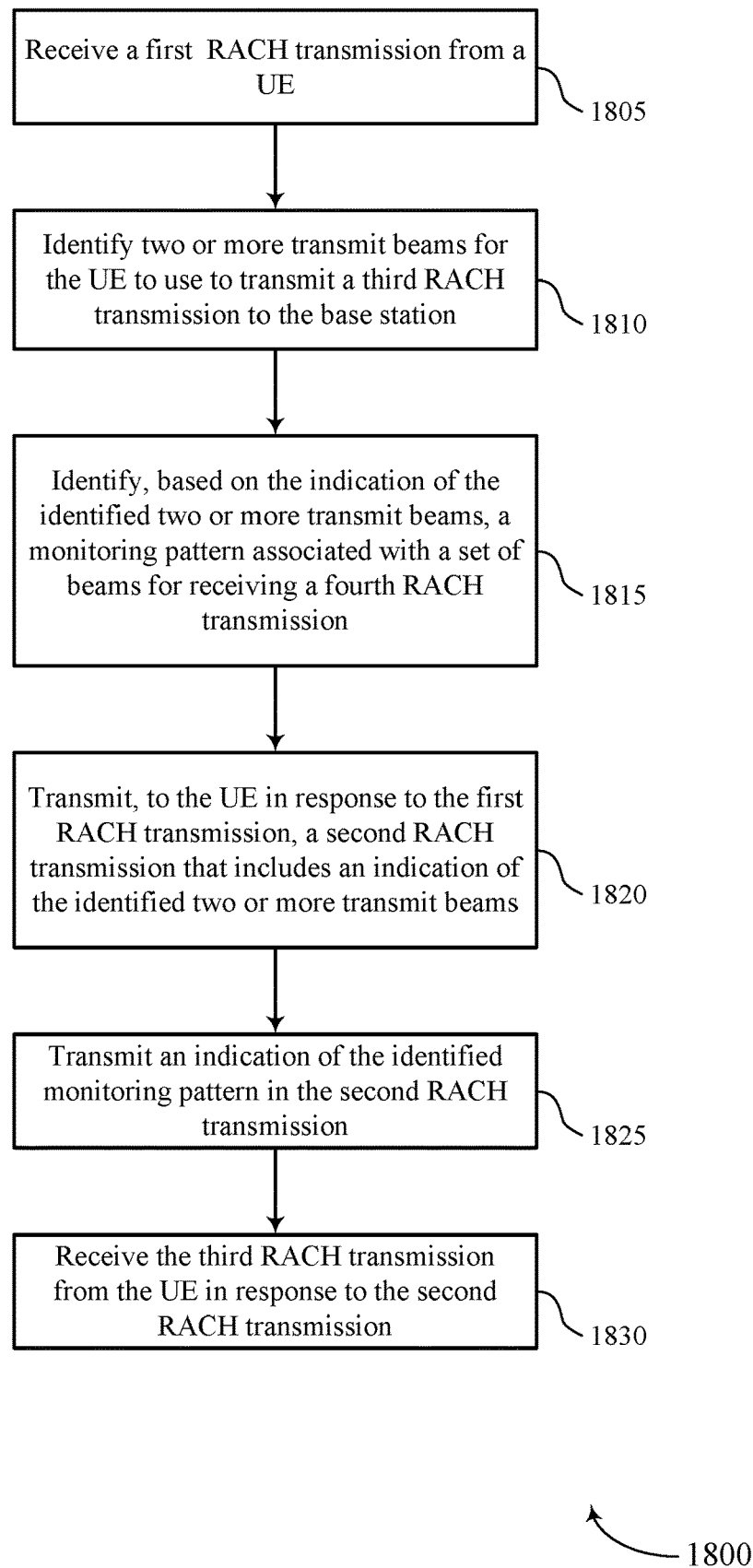

FIG. 18 shows a flowchart illustrating a method 1800 for multiple-beam uplink RACH messages in accordance with aspects of the present disclosure. The operations of method 1800 may be implemented by a base station 105 or its components as described herein. For example, the operations of method 1800 may be performed by a base station RACH manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 1805 the base station 105 may receive a first RACH transmission from a UE 115. The operations of block 1805 may be performed according to the methods described herein. In certain examples, aspects of the operations of block 1805 may be performed by a RACH component as described with reference to FIGS. 9 through 12.

At block 1810 the base station 105 may identify two or more transmit beams for the UE 115 to use to transmit a third RACH transmission to the base station. The operations of block 1810 may be performed according to the methods described herein. In certain examples, aspects of the operations of block 1810 may be performed by a transmit beam identification manager as described with reference to FIGS. 9 through 12.

At block 1815 the base station 105 may identify, based on the indication of the identified two or more transmit beams, a monitoring pattern associated with a plurality of beams for receiving a fourth RACH transmission. The operations of block 1815 may be performed according to the methods described herein. In certain examples, aspects of the operations of block 1815 may be performed by a monitoring pattern manager as described with reference to FIGS. 9 through 12.

At block 1820 the base station 105 may transmit, to the UE 115 in response to the first RACH transmission, a second RACH transmission that includes an indication of the identified two or more transmit beams. The operations of block 1820 may be performed according to the methods described herein. In certain examples, aspects of the operations of block 1820 may be performed by a base station RACH transmission manager as described with reference to FIGS. 9 through 12.

At block 1825 the base station 105 may transmit an indication of the identified monitoring pattern in the second RACH transmission. The operations of block 1825 may be performed according to the methods described herein. In certain examples, aspects of the operations of block 1825 may be performed by a base station RACH transmission manager as described with reference to FIGS. 9 through 12.

At block 1830 the base station 105 may receive the third RACH transmission from the UE 115 in response to the second RACH transmission. The operations of block 1830 may be performed according to the methods described herein. In certain examples, aspects of the operations of block 1830 may be performed by a RACH component as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   transmitting a first random access channel (RACH) transmission to a base station;
   receiving, from the base station in response to the first RACH transmission, a second RACH transmission that includes a first indication comprising a first beam identifier corresponding to a first beam and a second indication comprising a second beam identifier corresponding to a second beam for the UE to use to transmit a third RACH transmission;
   transmitting, to the base station and based at least in part on receiving the second RACH transmission that includes the first indication and the second indication, a first instance of the third RACH transmission using the first beam corresponding to the first beam identifier and a second instance of the third RACH transmission using the second beam corresponding to the second beam identifier; and
   receiving, from the base station in response to the third RACH transmission, a fourth RACH transmission that includes a third indication that the UE is to transmit a determined deployment type acknowledgement to the base station using one or more transmit beams.

2. The method of claim 1, further comprising:
   identifying receive beams used by the UE to receive synchronization signals from the base station; and
   determining the two or more transmit beams based at least in part on the identified receive beams.

3. The method of claim 1, further comprising:
   transmitting, with the third RACH transmission, a beam report that is based at least in part on synchronization signals received by the UE, or reference signals received by the UE, or a combination thereof.

4. The method of claim 1, further comprising:
   identifying, based at least in part on the second RACH transmission received from the base station, a monitoring pattern for the UE to use to receive the fourth RACH transmission.

5. The method of claim 4, wherein the monitoring pattern identifies a beam for the UE to use to receive the fourth RACH transmission.

6. The method of claim 1, wherein the third indication that the UE is to transmit the determined deployment type acknowledgement to the base station identifies the one or more transmit beams, or uplink control channel resources, or a combination thereof.

7. The method of claim 1, further comprising:
   identifying the one or more transmit beams based at least in part on the first indication comprising the first beam identifier, the second indication comprising the second beam identifier, or both for the UE to use to transmit the third RACH transmission.

8. The method of claim 1, further comprising:
   receiving the fourth RACH transmission on a plurality of beams, wherein the fourth RACH transmission includes a group acknowledgment configuration; and
   transmitting a group acknowledgment using the one or more transmit beams based at least in part on the group acknowledgment configuration.

9. The method of claim 1, further comprising:
   receiving synchronization signals from the base station after transmitting the first RACH transmission;
   performing a beam refinement procedure based at least in part on the received synchronization signals; and
   transmitting the third RACH transmission based at least in part on the performed beam refinement procedure.

10. The method of claim 1, wherein the first indication comprising the first beam identifier, the second indication comprising the second beam identifier, or both are based at least in part on a type of UE deployment.

11. The method of claim 1, wherein the first indication comprising the first beam identifier further comprises time-frequency resources for the first beam and the second indication comprising the second beam identifier further comprises time-frequency resources for the second beam.

12. The method of claim 1, wherein:
   the first RACH transmission comprises a random access request; and
   the second RACH transmission comprises a random access response.

13. A method for wireless communication at a base station, comprising:
   receiving a first random access channel (RACH) transmission from a user equipment (UE);
   identifying two or more transmit beams for the UE to use to transmit a third RACH transmission to the base station;

transmitting, to the UE in response to the first RACH transmission, a second RACH transmission that includes a first indication comprising a first beam identifier corresponding to a first beam of the identified two or more transmit beams and a second indication comprising a second beam identifier corresponding to a second beam of the identified two or more transmit beams;

receiving, from the UE in response to the second RACH transmission, the third RACH transmission based at least in part on the second RACH transmission including the first indication comprising the first beam identifier, the second indication comprising the second beam identifier, or both;

determining that the UE is to transmit a first acknowledgment to the base station responsive to a fourth RACH transmission; and transmitting, to the UE in response to the third RACH transmission, the fourth RACH transmission that includes a third indication that the UE is to transmit a second acknowledgement using one or more transmit beams based on the determination.

14. The method of claim 13, wherein the identifying the two or more transmit beams comprises:
determining a deployment type for the UE; and
selecting the two or more transmit beams based at least in part on the determined deployment type.

15. The method of claim 13, wherein the identifying the two or more transmit beams comprises:
performing, while receiving the first RACH transmission, a beam refinement procedure for a plurality of beams used for transmitting synchronization signals; and
selecting the two or more transmit beams based at least in part on the performed beam refinement procedure.

16. The method of claim 13, further comprising:
identifying, based at least in part on the first indication comprising the first beam identifier, the second indication comprising the second beam identifier, or both, a monitoring pattern associated with a plurality of beams for receiving the fourth RACH transmission; and
transmitting a fourth indication of the identified monitoring pattern in the second RACH transmission.

17. The method of claim 13, further comprising:
identifying time-frequency resources for the two or more transmit beams; and
transmitting, in the second RACH transmission, a fourth indication of the time-frequency resources for the two or more transmit beams.

18. The method of claim 13, further comprising:
transmitting synchronization signals, or reference signals, or a combination thereof; and
receiving, from the UE and with the third RACH transmission, a beam report that is based at least in part on the transmitted synchronization signals, or the transmitted reference signals, or a combination thereof.

19. The method of claim 13, wherein the third indication that the UE is to transmit the second acknowledgement identifies the one or more transmit beams, or uplink control channel resources, or a combination thereof.

20. The method of claim 13, further comprising:
identifying the one or more transmit beams based at least in part on the first indication comprising the first beam identifier, the second indication comprising the second beam identifier, or both for the UE to use to transmit the third RACH transmission, or a beam report received in the third RACH transmission, or a combination thereof.

21. The method of claim 13, further comprising:
transmitting the fourth RACH transmission on a plurality of transmit beams, wherein the fourth RACH transmission includes a group acknowledgment configuration; and
receiving a group acknowledgment using the one or more transmit beams based at least in part on the group acknowledgment configuration.

22. The method of claim 13, further comprising:
receiving the second acknowledgment from the UE based at least in part on the third indication that the UE is to transmit the second acknowledgement using the one or more transmit beams; and
configuring, during a radio resource control (RRC) connection setup process, multiple-beam communications with the UE based at least in part on the received second acknowledgment.

23. An apparatus for wireless communication at a user equipment (UE), comprising:
a processor;
memory coupled with the processor; and
instructions stored in the memory and operable, when executed by the processor, to cause the apparatus to:
transmit a first random access channel (RACH) transmission to a base station;
receive, from the base station in response to the first RACH transmission, a second RACH transmission that includes a first indication comprising a first beam identifier corresponding to a first beam and a second indication comprising a second beam identifier corresponding to a second beam the UE to use to transmit a third RACH transmission;
transmit, to the base station and based at least in part on receiving the second RACH transmission that includes the first indication and the second indication, a first instance of the third RACH transmission using the first beam corresponding to the first beam identifier and a second instance of the third RACH transmission using the second beam corresponding to the second beam identifier; and
receive, from the base station in response to the third RACH transmission, a fourth RACH transmission that includes a third indication that the UE is to transmit an acknowledgement to the base station using one or more transmit beams.

24. The apparatus of claim 23, wherein the instructions are further executable by the processor to cause the apparatus to:
identify receive beams used by the UE to receive synchronization signals from the base station; and
determine the two or more transmit beams based at least in part on the identified receive beams.

25. The apparatus of claim 23, wherein the instructions are further executable by the processor to cause the apparatus to:
transmit, with the third RACH transmission, a beam report that is based at least in part on synchronization signals received by the UE, or reference signals received by the UE, or a combination thereof.

26. An apparatus for wireless communication at a base station, comprising:
a processor;
memory coupled with the processor; and
instructions stored in the memory and operable, when executed by the processor, to cause the apparatus to:
receive a first random access channel (RACH) transmission from a user equipment (UE);

identify two or more transmit beams for the UE to use to transmit a third RACH transmission to the base station;

transmit, to the UE in response to the first RACH transmission, a second RACH transmission that includes a first indication comprising a first beam identifier corresponding to a first beam of the identified two or more transmit beams and a second indication comprising a second beam identifier corresponding to a second beam of the identified two or more transmit beams;

receive, from the UE in response to the second RACH transmission, the third RACH transmission based at least in part on the second RACH transmission including the first indication comprising the first beam identifier, the second indication comprising the second beam identifier, or both;

determine that the UE is to transmit a first acknowledgment to the base station responsive to a fourth RACH transmission; and transmit, to the UE in response to the third RACH transmission, the fourth RACH transmission that includes a third indication that the UE is to transmit a second acknowledgement using one or more transmit beams based on the determination.

27. The apparatus of claim 26, wherein the instructions executable by the processor to cause the apparatus to identify the two or more transmit beams comprise instructions executable by the processor to cause the apparatus to:

determine a deployment type for the UE; and select the two or more transmit beams based at least in part on the determined deployment type.

28. The apparatus of claim 26, wherein the instructions executable by the processor to cause the apparatus to identify the two or more transmit beams comprise instructions executable by the processor to cause the apparatus to:

perform, while receiving the first RACH transmission, a beam refinement procedure for a plurality of beams used for transmitting synchronization signals; and select the two or more transmit beams based at least in part on the performed beam refinement procedure.

\* \* \* \* \*